US009838633B2

(12) United States Patent
Muto et al.

(10) Patent No.: US 9,838,633 B2
(45) Date of Patent: Dec. 5, 2017

(54) PHOTOELECTRIC CONVERSION DEVICE AND IMAGE SENSING SYSTEM

(71) Applicant: CANON KABUSHIKI KAISHA, Tokyo (JP)

(72) Inventors: Takashi Muto, Kawasaki (JP); Yasushi Matsuno, Fujisawa (JP); Daisuke Yoshida, Ebina (JP); Hirofumi Totsuka, Fujisawa (JP); Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/665,137

(22) Filed: Mar. 23, 2015

(65) Prior Publication Data
US 2015/0281616 A1  Oct. 1, 2015

(30) Foreign Application Priority Data

Mar. 31, 2014 (JP) .................... 2014-073736
Aug. 11, 2014 (JP) .................... 2014-163939
Dec. 25, 2014 (JP) .................... 2014-263355

(51) Int. Cl.
*H04N 5/378* (2011.01)
*H04N 5/376* (2011.01)
*H04N 5/357* (2011.01)

(52) U.S. Cl.
CPC ........... *H04N 5/378* (2013.01); *H04N 5/3575* (2013.01); *H04N 5/3765* (2013.01)

(58) Field of Classification Search
CPC ..... H04N 5/3575; H04N 5/3765; H04N 5/378
See application file for complete search history.

(56) References Cited

U.S. PATENT DOCUMENTS

| 5,698,892 A | 12/1997 | Koizumi et al. |
| 6,188,094 B1 | 2/2001 | Kochi et al. |
| 6,605,850 B1 | 8/2003 | Kochi et al. |
| 6,670,990 B1 | 12/2003 | Kochi et al. |

(Continued)

FOREIGN PATENT DOCUMENTS

| CN | 102075703 A | 5/2011 |
| CN | 103681716 A | 3/2014 |
| JP | 2013-146045 A | 7/2013 |

OTHER PUBLICATIONS

Oct. 1, 2015 Search Report concerning corresponding Intellectual Property Office Application No. GB1505166.7.

(Continued)

*Primary Examiner* — Amy Hsu
(74) *Attorney, Agent, or Firm* — Fitzpatrick, Cella, Harper & Scinto

(57) ABSTRACT

A photoelectric conversion device includes a photoelectric converter, a transistor having a gate to which a voltage corresponding to charges generated by the photoelectric converter is supplied, a control line connected to a first main electrode of the transistor, and a readout unit configured to read out a signal corresponding to a voltage of the gate, and a voltage controller configured to change a voltage of the control line. The readout unit generates a digital signal corresponding to the voltage of the gate, based on a current flowing through a second main electrode of the transistor during a period in which the voltage controller changes the voltage of the control line.

64 Claims, 18 Drawing Sheets

(56) References Cited

U.S. PATENT DOCUMENTS

| | | |
|---|---|---|
| 6,946,637 B2 | 9/2005 | Kochi et al. |
| 6,960,751 B2 | 11/2005 | Hiyama et al. |
| 7,016,089 B2 | 3/2006 | Yoneda et al. |
| 7,110,030 B1 | 9/2006 | Kochi et al. |
| 7,227,208 B2 | 6/2007 | Ogura et al. |
| 7,321,110 B2 | 1/2008 | Okita et al. |
| 7,324,144 B1 | 1/2008 | Koizumi |
| 7,348,615 B2 | 3/2008 | Koizumi |
| 7,408,210 B2 | 8/2008 | Ogura et al. |
| 7,429,764 B2 | 9/2008 | Koizumi et al. |
| 7,460,162 B2 | 12/2008 | Koizumi et al. |
| 7,466,003 B2 | 12/2008 | Ueno et al. |
| 7,538,810 B2 | 5/2009 | Koizumi et al. |
| 7,547,871 B2 | 6/2009 | Hiyama et al. |
| 7,550,793 B2 | 6/2009 | Itano et al. |
| 7,554,591 B2 | 6/2009 | Kikuchi et al. |
| 7,605,415 B2 | 10/2009 | Koizumi et al. |
| 7,616,355 B2 | 11/2009 | Yoneda et al. |
| 7,629,568 B2 | 12/2009 | Koizumi et al. |
| 7,633,540 B2 | 12/2009 | Totsuka |
| 7,679,114 B2 | 3/2010 | Koizumi |
| 7,808,537 B2 | 10/2010 | Fujimura et al. |
| 7,852,393 B2 | 12/2010 | Kikuchi et al. |
| 7,864,384 B2 | 1/2011 | Yoneda et al. |
| 7,872,286 B2 | 1/2011 | Okita et al. |
| 7,906,755 B2 | 3/2011 | Koizumi et al. |
| 7,907,196 B2 | 3/2011 | Ogura et al. |
| 7,936,487 B2 | 5/2011 | Yoneda et al. |
| 7,939,868 B2 | 5/2011 | Koizumi |
| 7,943,975 B2 | 5/2011 | Koizumi et al. |
| 7,948,540 B2 | 5/2011 | Ogura et al. |
| 7,948,541 B2 | 5/2011 | Koizumi et al. |
| 7,973,839 B2 | 7/2011 | Koizumi |
| 7,978,241 B2 | 7/2011 | Koizumi et al. |
| 7,990,440 B2 | 8/2011 | Kobayashi et al. |
| 8,053,718 B2 | 11/2011 | Koizumi et al. |
| 8,063,958 B2 | 11/2011 | Okita et al. |
| 8,084,729 B2 | 12/2011 | Kato et al. |
| 8,085,319 B2 | 12/2011 | Ono et al. |
| 8,089,545 B2 | 1/2012 | Koizumi et al. |
| 8,120,681 B2 | 2/2012 | Ryoki et al. |
| 8,154,639 B2 | 4/2012 | Kato et al. |
| 8,169,525 B2 | 5/2012 | Ryoki et al. |
| 8,174,600 B2 | 5/2012 | Ogura et al. |
| 8,189,081 B2 | 5/2012 | Totsuka |
| 8,207,561 B2 | 6/2012 | Koizumi et al. |
| 8,248,677 B2 | 8/2012 | Yoneda et al. |
| 8,269,873 B2 | 9/2012 | Koseki et al. |
| 8,274,105 B2 | 9/2012 | Koizumi |
| 8,309,898 B2 | 11/2012 | Kato et al. |
| 8,319,872 B2 | 11/2012 | Koizumi |
| 8,345,133 B2 | 1/2013 | Matsuda et al. |
| 8,390,708 B2 | 3/2013 | Koizumi et al. |
| 8,400,546 B2 | 3/2013 | Itano et al. |
| 8,411,178 B2 | 4/2013 | Ogura et al. |
| 8,411,185 B2 | 4/2013 | Totsuka |
| 8,416,473 B2 | 4/2013 | Yoneda et al. |
| 8,421,894 B2 | 4/2013 | Koizumi et al. |
| 8,441,558 B2 | 5/2013 | Okita et al. |
| 8,477,224 B2 | 7/2013 | Ogura et al. |
| 8,520,102 B2 | 8/2013 | Ogura et al. |
| 8,520,108 B2 | 8/2013 | Ogura et al. |
| 8,553,115 B2 | 10/2013 | Arishima et al. |
| 8,553,118 B2 | 10/2013 | Saito et al. |
| 8,605,182 B2 | 12/2013 | Totsuka et al. |
| 8,624,307 B2 | 1/2014 | Koizumi et al. |
| 8,670,049 B2 | 3/2014 | Ono et al. |
| 8,670,056 B2 | 3/2014 | Kono et al. |
| 8,698,062 B2 | 4/2014 | Yoshida |
| 8,698,935 B2 | 4/2014 | Okita et al. |
| 8,749,675 B2 | 6/2014 | Koizumi et al. |
| 8,797,435 B2 | 8/2014 | Koizumi et al. |
| 8,872,092 B2 | 10/2014 | Ryoki et al. |
| 8,878,971 B2 | 11/2014 | Ryoki et al. |
| 8,883,526 B2 | 11/2014 | Okita et al. |
| 8,896,029 B2 | 11/2014 | Koizumi et al. |
| 8,928,790 B2 | 1/2015 | Ogura et al. |
| 8,937,672 B2 | 1/2015 | Totsuka et al. |
| 8,957,364 B2 | 2/2015 | Ryoki et al. |
| 8,975,676 B2 | 3/2015 | Koizumi |
| 9,007,501 B2 | 4/2015 | Matsuda et al. |
| 9,013,765 B2 | 4/2015 | Totsuka |
| 9,019,141 B2 | 4/2015 | Hashimoto et al. |
| 9,241,119 B2 | 1/2016 | Inui et al. |
| 9,332,202 B2 * | 5/2016 | Totsuka ............ H04N 5/37455 |
| 2005/0212937 A1 * | 9/2005 | Koyama ............ H04N 5/3559 |
| | | 348/301 |
| 2006/0203123 A1 | 9/2006 | Kasai |
| 2013/0092983 A1 | 4/2013 | Matsuda et al. |
| 2013/0154705 A1 | 6/2013 | Sakurai et al. |
| 2013/0181118 A1 | 7/2013 | Koizumi et al. |
| 2013/0206961 A1 | 8/2013 | Ikeda et al. |
| 2013/0271633 A1 | 10/2013 | Hashimoto et al. |
| 2013/0341489 A1 | 12/2013 | Yoshida |
| 2014/0001339 A1 | 1/2014 | Arishima et al. |
| 2014/0008522 A1 | 1/2014 | Saito et al. |
| 2014/0168491 A1 | 6/2014 | Totsuka |
| 2014/0263952 A1 * | 9/2014 | Taghibakhsh ......... H04N 5/378 |
| | | 250/208.1 |
| 2015/0009389 A1 | 1/2015 | Ryoki et al. |
| 2015/0077605 A1 | 3/2015 | Takada et al. |
| 2015/0092095 A1 | 4/2015 | Matsuda et al. |
| 2015/0124142 A1 | 5/2015 | Hashimoto et al. |
| 2015/0201144 A1 * | 7/2015 | Kobayashi ............ H04N 5/378 |
| | | 348/308 |
| 2015/0222831 A1 * | 8/2015 | Hashimoto ............ H04N 5/353 |
| | | 348/301 |
| 2015/0222836 A1 * | 8/2015 | Wada ................ H04N 5/3559 |
| | | 348/222.1 |
| 2015/0244963 A1 * | 8/2015 | Totsuka ............ H04N 5/37455 |
| | | 348/308 |
| 2015/0281614 A1 * | 10/2015 | Yoshida ............. H04N 5/3745 |
| | | 348/308 |
| 2016/0261817 A1 * | 9/2016 | Totsuka ................ H04N 5/363 |

OTHER PUBLICATIONS

U.S. Appl. No. 14/591,180, filed Jan. 7, 2015, Hideo Kobayashi, et al.
U.S. Appl. No. 14/612,572, filed Feb. 3, 2015, Hirofumi Totsuka, et al.
U.S. Appl. No. 14/625,077, filed Feb. 18, 2015, Hirofumi Totsuka.
U.S. Appl. No. 14/640,526, filed Mar. 6, 2015, Masahiro Kobayashi, et al.
U.S. Appl. No. 14/658,638, filed Mar. 16, 2015, Seiji Hashimoto, et al.
U.S. Appl. No. 14/662,604, filed Mar. 19, 2015, Daisuke Yoshida et al.
U.S. Appl. No. 14/691, 916, filed Apr. 21, 2015, Daisuke Yoshida.
Office Action dated Aug. 17, 2017, in Chinese Patent Application No. 201510147550.0.

* cited by examiner

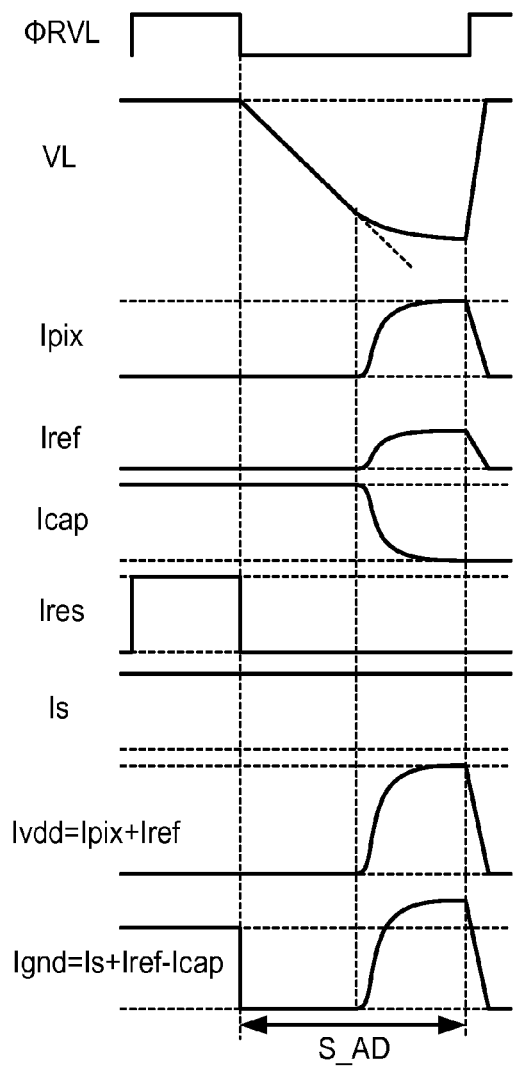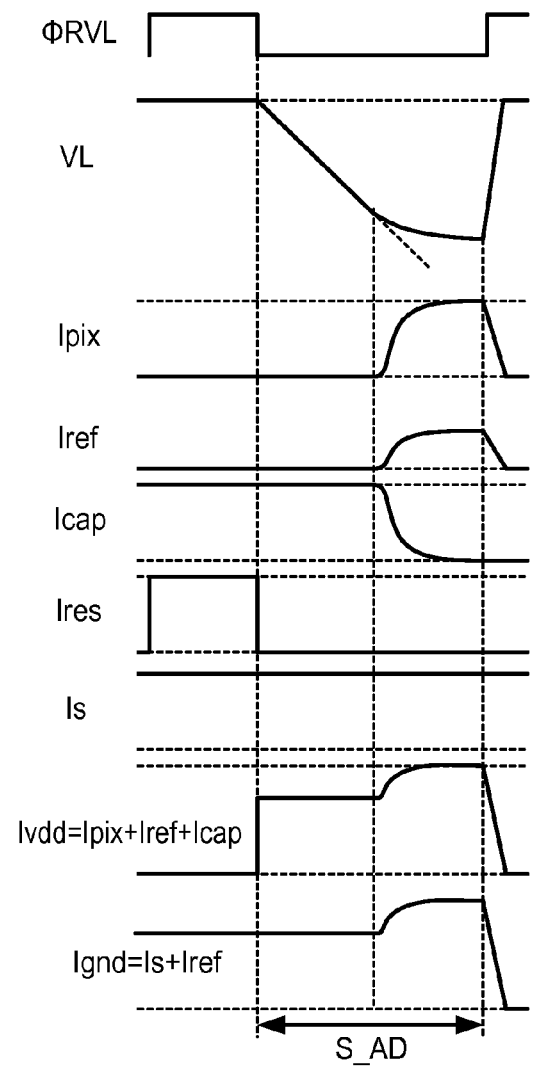

PHOTOELECTRIC CONVERSION DEVICE AND IMAGE SENSING SYSTEM

BACKGROUND OF THE INVENTION

Field of the Invention

The present invention relates to a photoelectric conversion device and an image sensing system.

Description of the Related Art

Japanese Patent Laid-Open No. 2013-146045 discloses a photoelectric conversion device including pixels which output current signals in accordance with charge quantities generated by photoelectric conversion (FIG. 2 of Japanese Patent Laid-Open No. 2013-146045). Each pixel includes a photodiode and a differential amplifier. The differential amplifier includes a first input transistor and a second input transistor. A node to which charges generated by the photodiode are transferred is connected to the gate of the first input transistor. A reset voltage supply line VRES is connected to the second input transistor. The source of the first input transistor is connected to the drain of the first selecting transistor via a resistor R1. The source of the second input transistor is connected to the drain of the first selecting transistor via a resistor R2. The drain of the second input transistor is connected to an output node OUT via a second selecting transistor. A current signal corresponding to the charge quantity generated by photoelectric conversion is output from the output node OUT. In the photoelectric conversion device described in Japanese Patent Laid-Open No. 2013-146045, a digital signal corresponding to the charge quantity generated by photoelectric conversion is generated based on the current signal output from the output node OUT of the pixel.

The photoelectric conversion device described in Japanese Patent Laid-Open No. 2013-146045 incorporates the differential amplifier in each pixel. The circuit scale of each pixel increases and is not suitable for a multi-pixel arrangement.

SUMMARY OF THE INVENTION

Embodiments of the present invention provide a photoelectric conversion device suitable for simplifying the circuit arrangement of each pixel and obtaining a multi-pixel arrangement.

One aspect of the present invention provides a photoelectric conversion device comprising: a photoelectric converter; a transistor having a gate, a first main electrode and a second main electrode, a voltage corresponding to charges generated by the photoelectric converter being supplied to the gate, a control line connected to the first main electrode of the transistor, and a readout unit configured to read out a signal corresponding to a voltage of the gate; and a voltage controller configured to change a voltage of the control line, wherein the readout unit generates a digital signal corresponding to the voltage of the gate, based on a current flowing through the second main electrode of the transistor during a period in which the voltage controller changes the voltage of the control line.

Further features of the present invention will become apparent from the following description of exemplary embodiments with reference to the attached drawings.

BRIEF DESCRIPTION OF THE DRAWINGS

FIGS. 12A and 12B are timing charts for explaining the readout operation of the photoelectric conversion device according to the sixth embodiment;

DESCRIPTION OF THE EMBODIMENTS

The present invention will be described using exemplary embodiments with reference to the accompanying drawings below.

Figure 1:
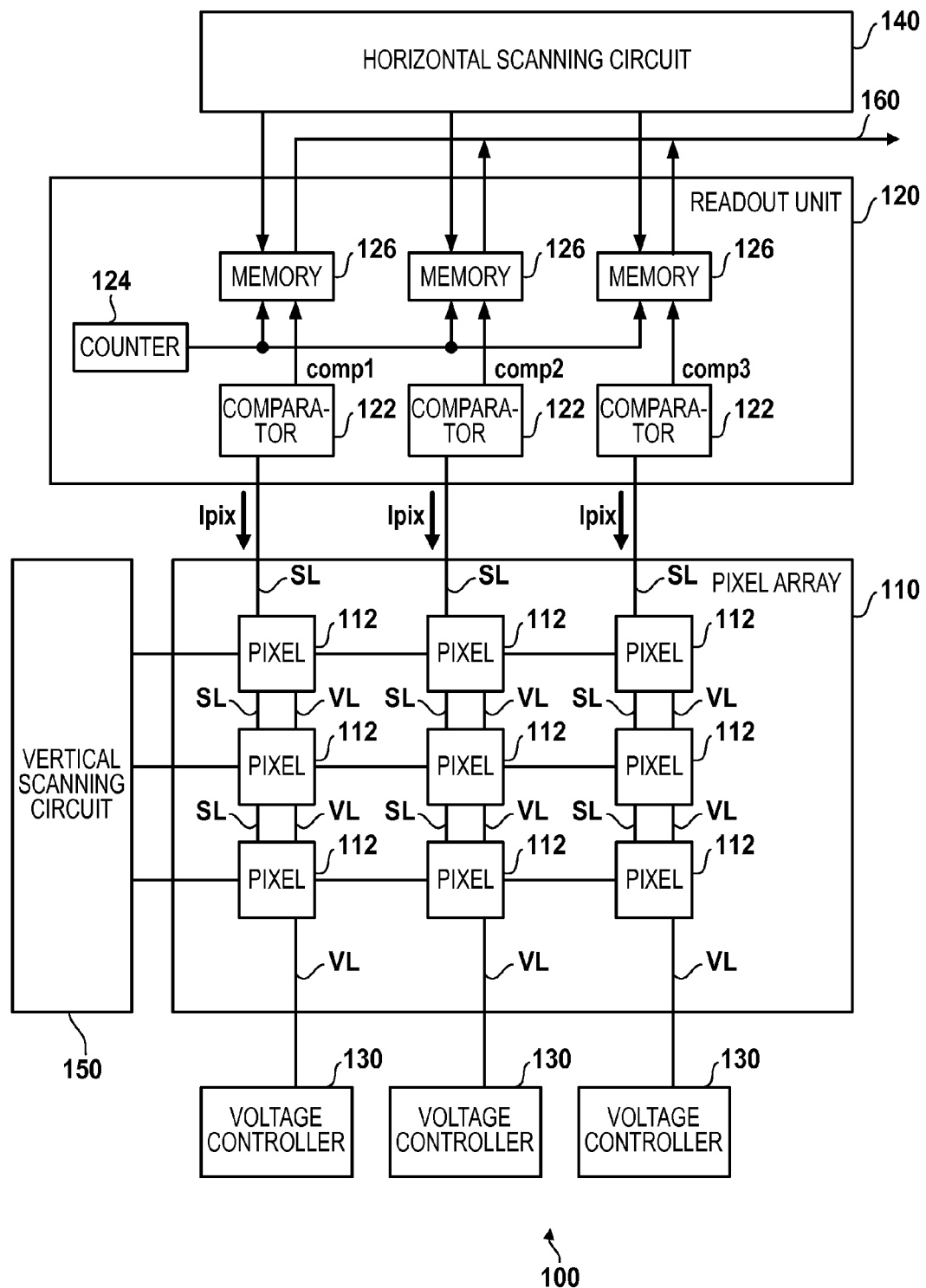
FIG. 1 is a block diagram showing the arrangement of a photoelectric conversion device according to the first embodiment.

FIG. 1 shows the arrangement of a photoelectric conversion device 100 according to the first embodiment of the present invention. The photoelectric conversion device 100 can be ultimately assumed as an apparatus that includes at least one pixel 112. Typically, the photoelectric conversion device 100 can be arranged as a solid-stage image sensor having a pixel array 110 in which a plurality of pixels 112 are arrayed one-dimensionally or two-dimensionally. In the example shown in FIG. 1, the plurality of pixels 112 are arranged to form a plurality of rows and a plurality of columns, that is, two-dimensionally.

The photoelectric conversion device 100 comprises a voltage controller 130 which supplies a control voltage V_VL to each pixel 112 via a control line VL and a readout unit 120 which reads out a signal from each pixel 112 via a sensing line SL. In this case, one voltage controller 130 is arranged for each column of the pixel array 110.

The photoelectric conversion device 100 further includes a vertical scanning circuit (vertical selector) 150 and a horizontal scanning circuit (horizontal selector) 140, both of which select the pixel 112 as the signal readout target. The vertical scanning circuit 150 selects a readout target row among a plurality of rows in the pixel array 110, and the readout unit 120 reads out the signal of each selected row pixel 112 via a sensing line SL. The horizontal scanning circuit 140 selects the readout target column pixel 112 among the digital signals of the plurality of column pixels 112 read out by the readout unit 120 and outputs the signal of each pixel 112 to an output signal line 160. More specifically, the horizontal scanning circuit 140 selects the readout target column among the plurality of columns in the pixel array 110.

Each voltage controller 130 changes the voltage V_VL of the control line VL. Each row pixel 112 selected by the vertical scanning circuit 150 forms a current path in the sensing line SL when the voltage V_VL of the control line VL has changed to the voltage corresponding to the charge quantity generated by photoelectric conversion, thereby flowing a pixel current Ipix. Based on the pixel current Ipix, the readout unit 120 generates a digital signal corresponding to the charge quantity generated by photoelectric conversion.

The readout unit 120 includes comparators 122, a counter 124, and memories 126. Each comparator 122 detects that the value of the pixel current Ipix exceeds the value (threshold) of a reference current Iref. The counter 124 starts the count operation at a predetermined timing. The memories 126 hold the count values of the counter 124 as digital signals corresponding to the signals of the pixels 112 in accordance with the transition of comparison result signals comp1, comp2, and comp3 of the comparators 122. In this case, "1", "2", and "3" of the comparison result signals comp1, comp2, and comp3 are identifiers for distinguishing comparison result signals comp of the plurality of comparators 122 respectively corresponding to the plurality of columns of the pixel array 110.

Figure 2:
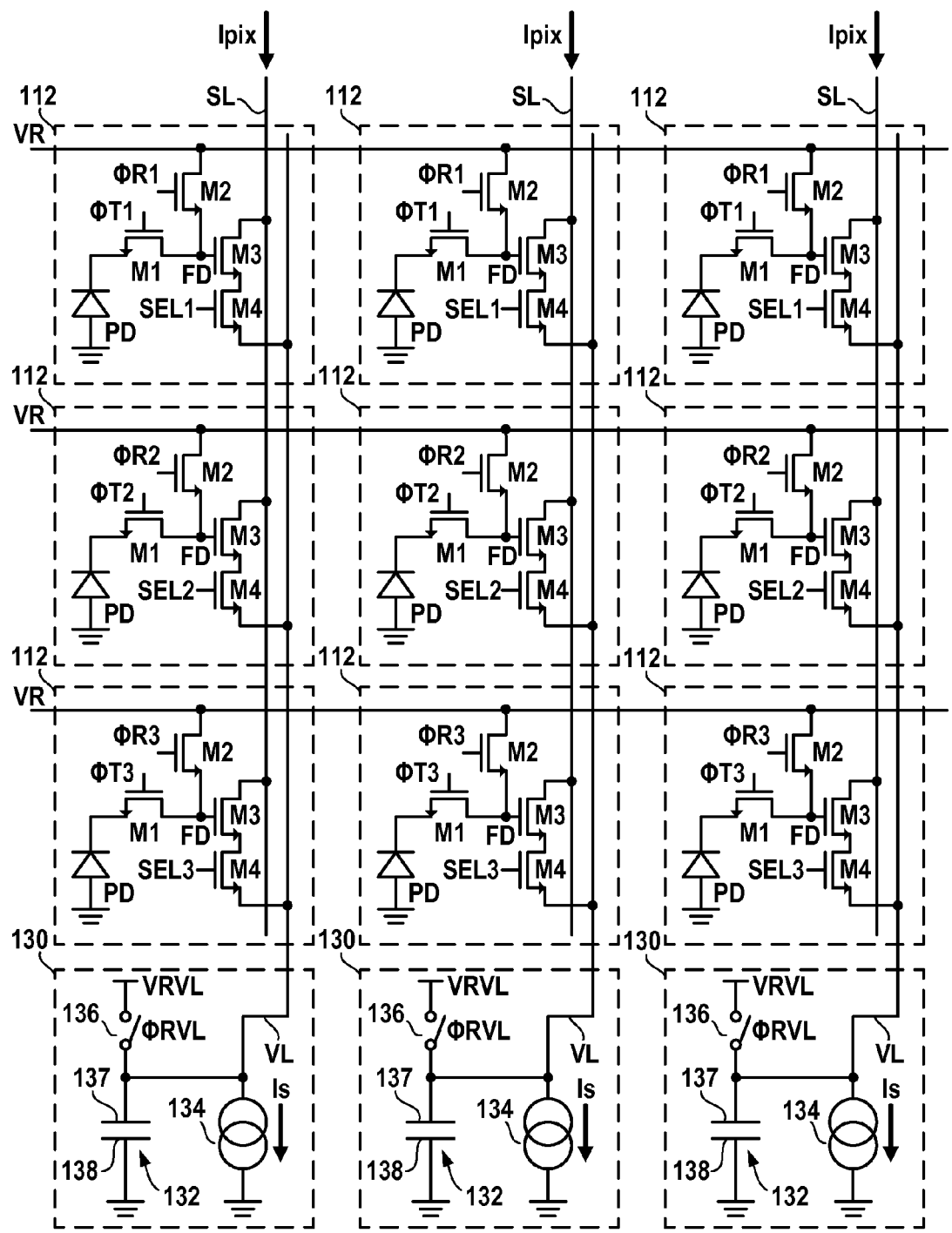
FIG. 2 is a circuit diagram showing an example of the arrangement of a pixel array and a voltage controller according to the first embodiment.
Figure 3:
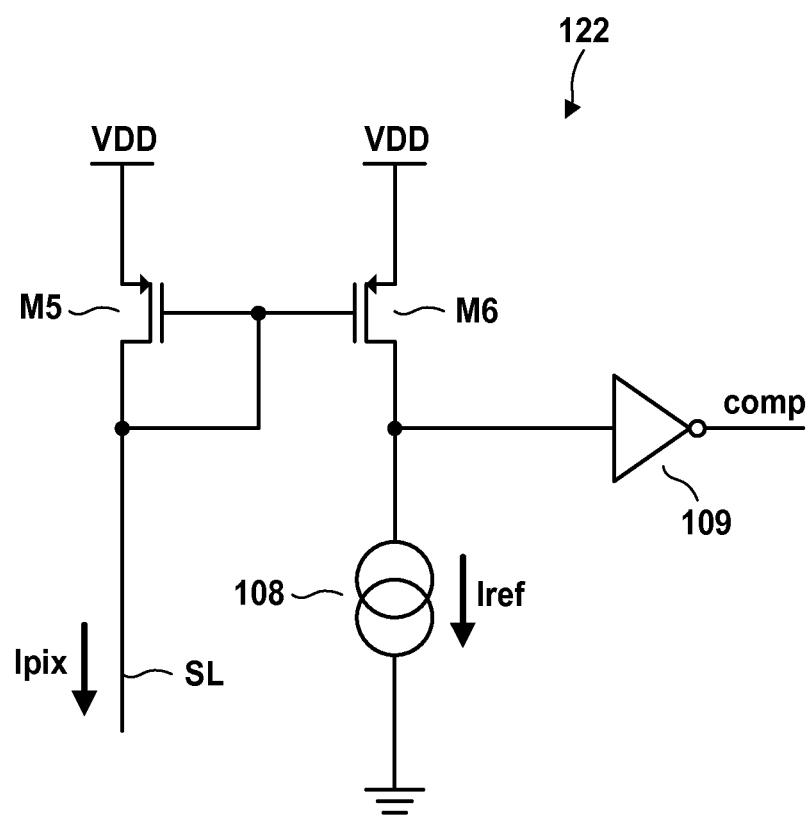
FIG. 3 is a circuit diagram showing an example of the arrangement of a comparator in a readout unit.

FIG. 2 shows an example of the arrangement of the pixel array 110 and the voltage controllers 130. FIG. 3 shows an example of the arrangement of the comparator 122 of the readout unit 120. The arrangement and operation of the photoelectric conversion device 100 will be described in detail with reference to FIGS. 1 to 3.

Each pixel 112 includes, as basic components, a photoelectric converter PD such as a photodiode and a transistor (readout transistor) M3 having the gate to which a voltage corresponding to the charges generated by the photoelectric converter PD is supplied. Each pixel 112 can include a charge-voltage converter (floating diffusion) FD connected to the gate of the transistor M3 and a transfer transistor M1 which transfers the charges generated by the photoelectric converter PD to the charge-voltage converter FD. Each pixel 112 can further include a reset transistor M2 which resets the voltage of the charge-voltage converter FD. Each pixel 112 can further include a selecting transistor M4. The selecting transistor M4 is arranged in a path between the transistor M3 and the control line VL or in the path between the transistor M3 and the sensing line SL.

The transfer transistor M1 is turned on when the vertical scanning circuit 150 activates a transfer signal $\Phi T$ ($\Phi T1$, $\Phi T2$, or $\Phi T3$). The transfer transistor M1 then transfers the charges of the photoelectric converter PD to the charge-voltage converter FD. In this case, "1", "2", and "3" of the transfer signals $\Phi T1$, $\Phi T2$, and $\Phi T3$ are identifiers for distinguishing the transfer signals $\Phi T$ corresponding to the plurality of rows of the pixel array 110. The reset transistor M2 is turned on when the reset signal OR ($\Phi R1$, $\Phi R2$, or $\Phi R3$) is activated and resets the voltage of the charge-voltage converter FD to a reset voltage corresponding to the voltage of the reset voltage line VR. In this case, "1", "2", and "3" of the reset signals $\Phi R1$, $\Phi R2$, and $\Phi R3$ are identifiers for distinguishing the reset signals OR corresponding to the plurality of rows of the pixel array 110. The selecting transistor M4 is turned on when a selecting signal SEL (SEL1, SEL2, or SEL3) is activated and sets the pixel 112 corresponding to the selecting signal SEL in a selecting state. In this case, "1", "2", and "3" of the selecting signals SEL1, SEL2, and SEL3 are identifiers for distinguishing the selecting signals SEL corresponding to the plurality of rows of the pixel array 110.

The pixel 112 according to the first embodiment of the present invention does not include any differential amplifier exemplified as in the photoelectric conversion device described in Japanese Patent Laid-Open No. 2013-146045. The pixel 112 according to the first embodiment of the present invention has a smaller circuit scale than that of the pixel described in patent literature 1 and is therefore suitable for a multi-pixel arrangement.

The voltage V_VL of the control line VL is controlled by the voltage controller 130. Each voltage controller 130 controls the voltage of the control line VL so as to increase the voltage between the gate of the transistor M3 and the source (first main electrode) of the transistor M3, that is, in a direction from the OFF state to the ON state of the transistor M3. In other words, according to the first embodiment, the voltage controller 130 drops the voltage V_VL of the control line VL.

Each voltage controller 130 includes a capacitor 132, a switch 136, and a current source 134. The capacitor 132 includes a first node 137 connected to the control line VL and a second node 138 connected to a predetermined voltage (in this example, a ground voltage). The switch 136 is arranged in a path between the first node 137 of the capacitor 132 and the first voltage line to which a first voltage VRVL is applied. The switch 136 sets the voltage of the first node 137 of the capacitor 132 and the voltage V_VL of the control line VL to a voltage corresponding to the first voltage VRVL when a reset signal $\Phi RVL$ is activated. The current source 134 is arranged between the first node 137 (and the control line VL) of the capacitor 132 and the second voltage line (in this example, a ground voltage line) to which the second voltage (in this case, a ground voltage) is applied. When the reset signal $\Phi RVL$ is activated, the charges accumulated in the capacitor 132 are removed by a current value Is via the current source 134, thereby linearly dropping the voltage V_VL of the control line VL.

The comparator 122 detects that the current Ipix flowing through the drain (the second main electrode) of the transistor M3 of each pixel 112 exceeds the value (threshold) of the reference current Iref. The comparator 122 includes transistors M5 and M6 such as PMOS transistor which form a current mirror and a current source 108 which flows the reference current Iref. The comparator 122 includes an inverter (inverting amplifier) 109 having an input connected to a node between the drain of the transistor M6 and the current source 108. The reference current Iref flowing from the current source 108 determines a comparison reference (threshold) in the comparator 122. The gate of the transistor (second transistor) M5 is connected to the drain of the transistor M5, the sensing line SL, and the gate of the transistor (third transistor) M6. The inverter (inverting amplifier) 109 outputs the comparison result signal comp. The memories 126 hold the count values of the counter 124 as the digital signals corresponding to the signals of the pixels 112 in accordance with the transition of the comparison result signals comp1, comp2, and comp3 of the comparators 122. The inverter 109 is an example of an output circuit and may be replaced with another inverting amplifier such as a source-grounded amplifier.

Each readout unit 120 generates a digital signal corresponding to the voltage of the charge-voltage converter FD of the pixel 112 in response to a timing at which the value of the pixel current Ipix flowing through the drain (second main electrode) of the transistor M3 of the pixel 112 exceeds the reference current Iref (threshold).

Figure 4:
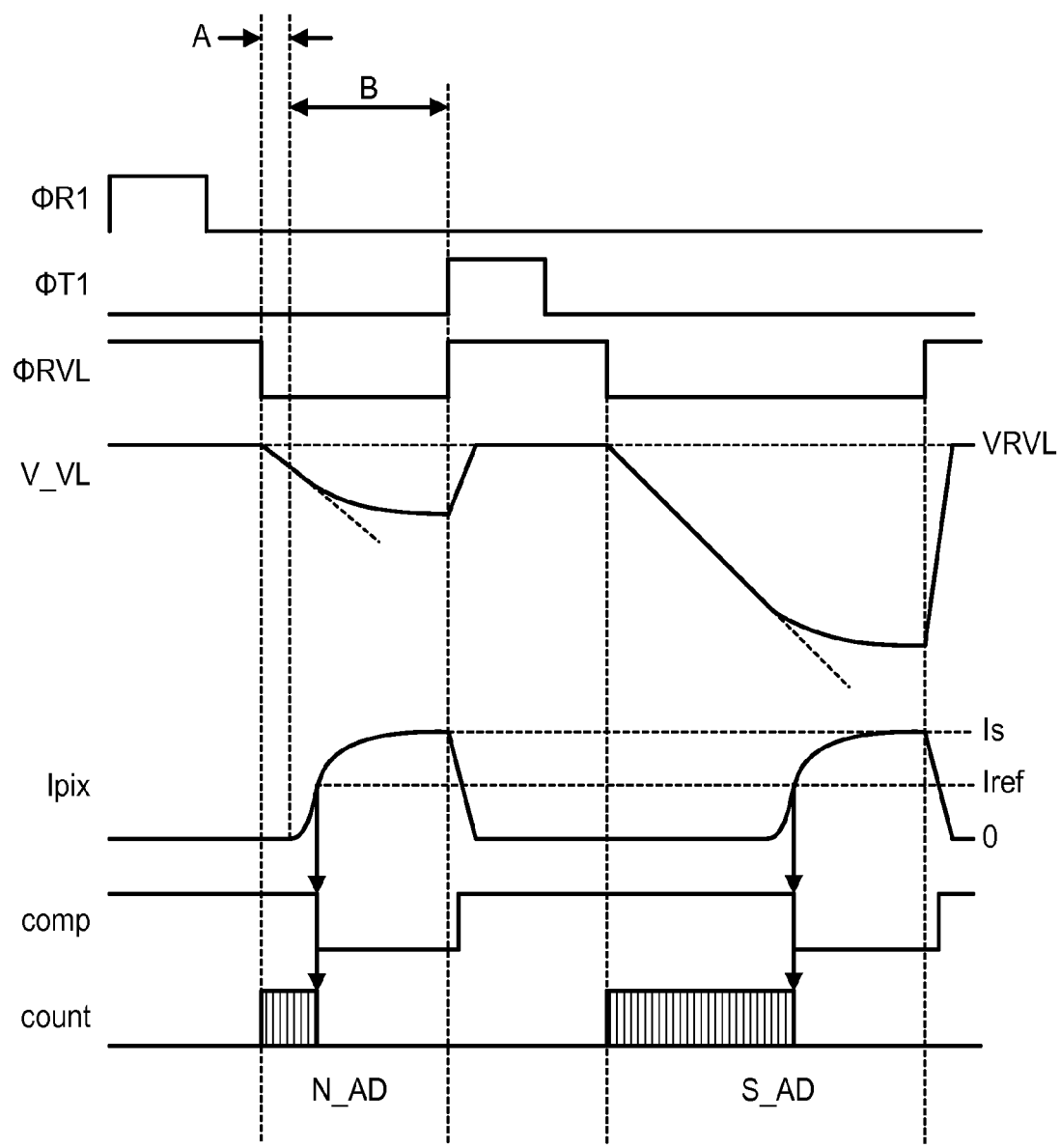
FIG. 4 is a timing chart showing the readout operation of a signal from a pixel on the first row and a given column according to the first embodiment.

FIG. 4 shows the readout operation of a signal of the pixel 112 on the first row and a given column according to the first embodiment. This readout operation includes a noise level readout operation N_AD and an optical signal readout operation S_AD. The noise level readout operation N_AD is an operation of reading out, as a digital signal, a signal corresponding to the voltage of the charge-voltage converter FD immediately after the charge-voltage converter FD is reset. The optical signal level readout operation S_AD is an operation of reading out, as a digital signal, a signal corresponding to the voltage of the charge-voltage converter FD after the charges of the photoelectric converter PD are transferred to the charge-voltage converter FD.

When the reset signal ΦR1 is activated for a predetermined time, the reset transistor M2 is turned on. The voltage of the charge-voltage converter FD is reset to a reset voltage corresponding to the reset voltage VR via the reset transistor M2. Resetting of the voltage of the charge-voltage converter FD is complete by deactivating the reset signal ΦR1. Simultaneously with resetting of the voltage of the charge-voltage converter FD, the reset signal ΦRVL is activated for a predetermined time to turn on the switch 136. The voltage V_VL of the control line VL is reset to a voltage corresponding to the reset voltage VRVL via the switch 136. The voltage at the first node of the capacitor 132 connected to the control line VL is also reset to the voltage corresponding to the reset voltage VRVL. Resetting of the voltage V_VL of the control line VL is complete by deactivating the reset signal ΦRVL. In this case, the reset voltage VRVL (the voltage of the first voltage line) is determined such that the voltage set in the control line VL by turning on the switch 136 is a voltage not to turn on the transistor M3 of the pixel 112.

The noise level readout operation N_AD starts by deactivation of the reset signal ΦRVL. By deactivation of the reset signal ΦRVL, the charges accumulated in the capacitor 132 are removed by the current value Is of the current source 134, thereby linearly dropping the voltage V_VL of the control line VL. A period during which the voltage V_VL of the control line VL linearly drops is indicated as an period A. The count operation of the counter 124 starts by deactivation of the reset signal ΦRVL. The count operation is indicated as "count" in FIG. 4.

The period A ends when the voltage V_VL of the control line VL drops to a voltage at which the voltage between the gate and source of the transistor M3 of the pixel 112 of the readout target row exceeds the threshold of the transistor M3 and shifts to an period B. The voltage V_VL linearly changes during the period A, and nonlinearly changes during the period B. When the voltage V_VL of the control line VL drops to a voltage at which the voltage between the gate and source of the transistor M3 of the pixel 112 as the readout target exceeds the threshold of the transistor M3, the transistor M3 is turned on to start flowing the pixel current Ipix. The pixel current Ipix flows to the control line VL via the transistor M3 and the selecting transistor M4. The value of the current which can flow through the control line VL is limited to the current value Is by the current source 134. Accordingly, the discharge current from the capacitor 132 becomes small because the pixel current Ipix flows. Therefore, the voltage drop of the voltage V_VL of the control line VL changes nonlinearly.

After the pixel current Ipix starts flowing, when the value of the pixel current Ipix exceeds the value (threshold) of the reference current Iref, the comparator 122 of the readout unit 120 detects this. That is, the comparison result signal comp is activated (inverted), and accordingly the count value of the counter 124 is held as a digital signal representing the noise level in the noise level holding memory of the memory 126. That is, the readout unit 120 generates a digital signal for a time from the timing at which the switch 136 is turned off after charging of the capacitor 132 to a timing at which the value of the pixel current Ipix flowing through the drain of the transistor M3 of the pixel 112 exceeds the value of the reference current Iref.

The noise level readout operation N_AD is complete a sufficient time after the deactivation of the reset signal ΦRVL. After that, the transfer signal ΦT1 is activated for a predetermined time, and the reset signal ΦRVL is activated for a predetermined time. The period B is complete by activation of the reset signal ΦRVL. When the transfer signal ΦT1 is activated, the charges of the photoelectric converter PD are transferred to the charge-voltage converter FD, thereby changing the voltage of the charge-voltage converter PD. When the reset signal ΦRVL is activated for a predetermined time, the switch 136 is turned on to reset the voltage V_VL of the control line VL to a voltage corresponding to the reset voltage VRVL via the switch 136. Resetting of the voltage V_VL of the control line VL is complete by deactivation of the reset signal ΦRVL.

The optical signal level readout operation S_AD starts by deactivation of the reset signal ΦRVL. By the deactivation of the reset signal ΦRVL, the charges accumulated in the capacitor 132 are removed by the current value Is from the current source 134 to linearly drop the voltage V_VL of the control line VL. The subsequent operation is basically the same as in the noise level readout operation N_AD, but the readout time is longer than that of the readout operation N_AD.

When the voltage V_VL of the control line VL drops to a voltage at which the voltage between the gate and source of the transistor M3 of the pixel 112 as the readout target row exceeds the threshold of the transistor M3, the transistor M3 is turned on to start flowing the pixel current Ipix. After the pixel current Ipix starts flowing, when the value of the pixel current Ipix exceeds the value (threshold) of the reference current Iref, the comparator 122 of the readout unit 120 detects this. That is, the comparison result signal comp is activated (inverted), and accordingly the count value of the counter 124 is held in the optical signal level holding memory of the memory 126 as a digital signal representing the optical signal level. That is, the readout unit 120 generates a digital signal for a time from a timing at which the switch 136 is turned off after charging of the capacitor 132 to a timing at which the value of the pixel current Ipix flowing through the drain of the transistor M3 of the pixel 112 exceeds the value of the reference current Iref.

The digital signal representing the noise level and the digital signal representing the optical signal level, which are held in the memory 126, are output to the output signal line 160 in response to a command from the horizontal scanning circuit 140. The digital signal representing the noise level and the digital signal representing the optical signal level may be output from the photoelectric conversion device 100, or a difference between them may be output from the photoelectric conversion device 100.

Note that the capacitor 132 need not be limited to a capacitor added to the control line VL, but can be a parasitic capacitance of the control line VL.

The feature of the photoelectric conversion device 100 according to the first embodiment will be described as compared with a general photoelectric conversion device including an A/D converter. In the general photoelectric conversion device, a pixel signal is output in the form of a voltage signal to a column signal line via an amplification transistor arranged in the pixel. This pixel signal is amplified by a column amplifier and converted into a digital signal by the A/D converter. According to this method, after the voltage of the column signal line is settled and the output from the column amplifier arranged in each column of the pixel array 110 is settled, A/D conversion by the A/D converter must be started.

On the other hand, the photoelectric conversion device 100 according to the first embodiment performs broad A/D conversion from the viewpoint that the signal corresponding to the voltage of the charge-voltage converter FD is output as a digital signal. However, in the photoelectric conversion device 100 according to the first embodiment, the voltage of the charge-voltage converter FD is not read out as an analog voltage signal, and the analog voltage signal is not converted into the digital signal. The photoelectric conversion device 100 according to the first embodiment starts the broad A/D conversion at the same time of the start of the drop of the voltage V_VL of the control line VL. The photoelectric conversion device 100 according to the first embodiment need not wait for settling of the voltage of the signal line. Therefore, the photoelectric conversion device 100 according to the first embodiment is advantageous in high-speed signal readout from the pixel 112.

Figure 5:
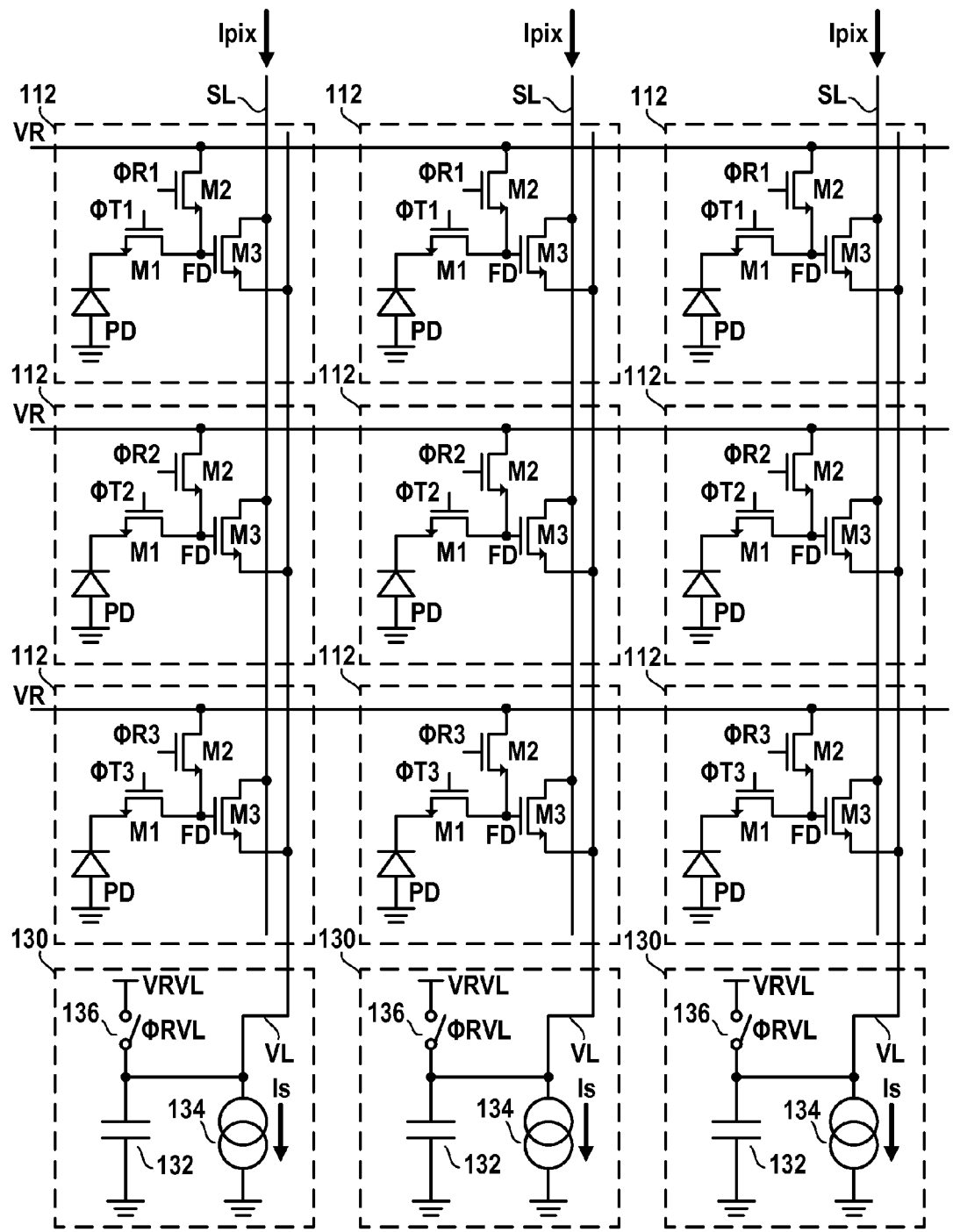
FIG. 5 is a circuit diagram showing the arrangement of a photoelectric conversion device according to the second embodiment.

FIG. 5 shows an example of the arrangement of a pixel array 110 and voltage controllers 130 in a photoelectric conversion device 100 according to the second embodiment of the present invention. Items which will not be described as the second embodiment comply with the first embodiment. In the second embodiment, the selecting transistor M4 is omitted. In the second embodiment, a pixel 112 is selected by a reset voltage for resetting a charge-voltage converter FD. More specifically, the voltage of the charge-voltage converter FD of the pixel 112 as the selection target row is reset to a first voltage capable of signal readout. On the other hand, the voltage of the charge-voltage converter FD of the pixel 112 as an unselected target row is reset to a second voltage which is lower than the first voltage and lower than the lower limit of the sweep range of the voltage of a control line VL by the corresponding voltage controller 130.

Figure 6:
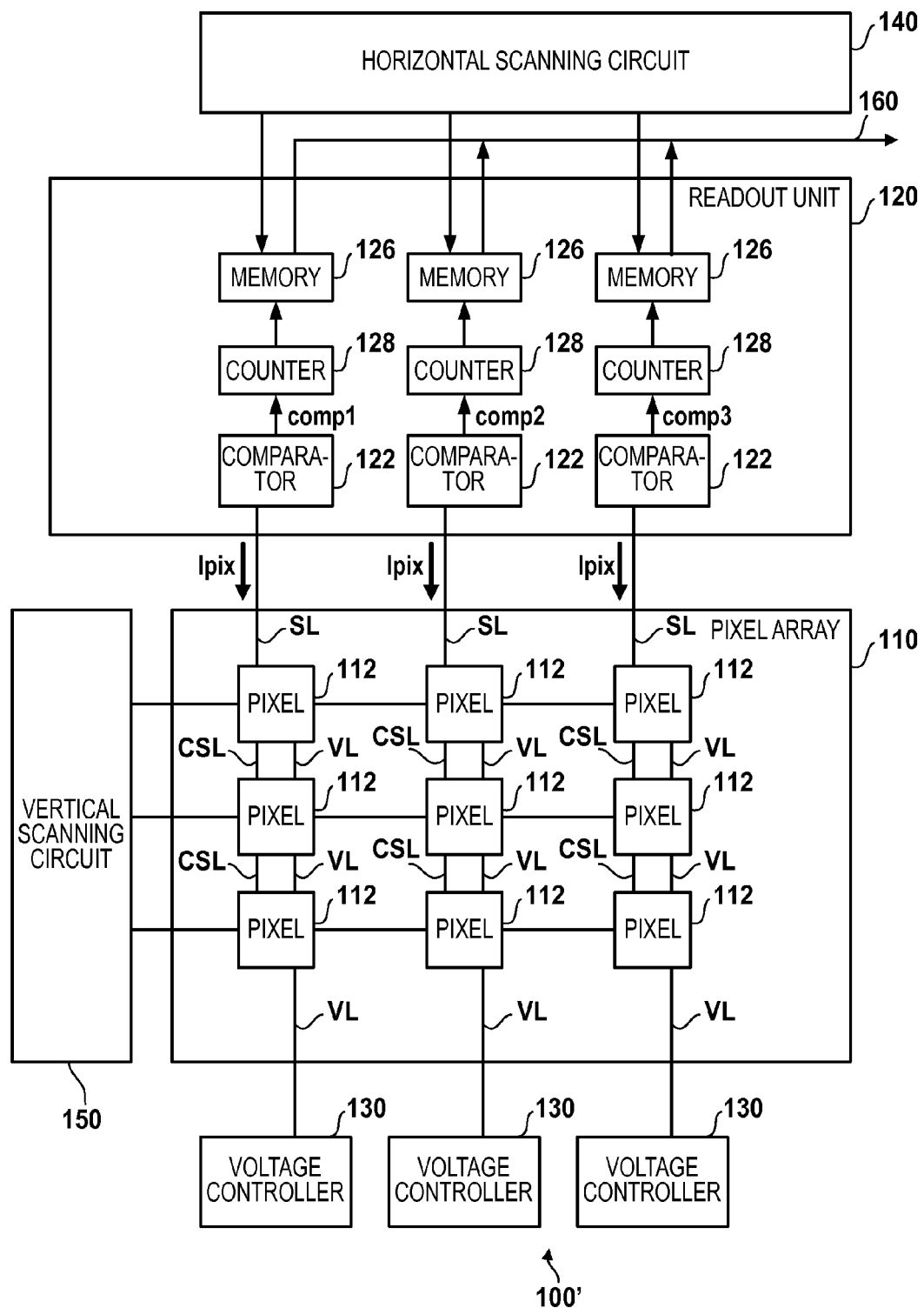
FIG. 6 is a block diagram showing the arrangement of a photoelectric conversion device according to the third embodiment.

FIG. 6 shows the arrangement of a photoelectric conversion device 100' according to the third embodiment of the present invention. Items which will not be described as the third embodiment comply with the first or second embodiment. In the third embodiment, the arrangement of a readout unit 120 is different from that of the first or second embodiment, and each counter 128 is arranged for each column. That is, the readout unit 120 includes one comparator 122, one counter 128, and one memory 126 for each column of a pixel array 110. The counters 128 stop the count operations by the transition of comparison result signals comp from the corresponding comparators 122. Each memory 126 holds the count value of the corresponding counter 128.

Figure 7:
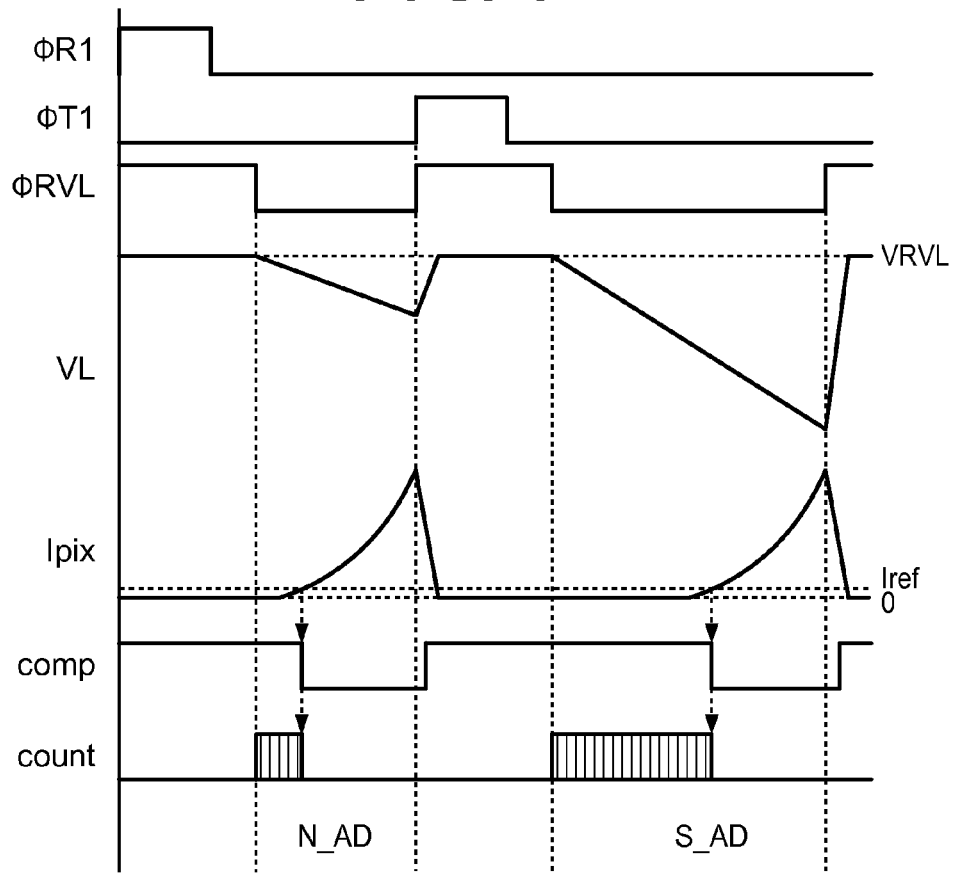
FIG. 7 is a timing chart showing the readout operation of a signal on the first row and a given column according to the fourth embodiment.

FIG. 7 shows the readout operation of a signal of a pixel 112 on the first row and a given column according to the fourth embodiment of the present invention. Items which substantially correspond to those of the first to third embodiments will not be described. According to the fourth embodiment, each voltage controller 130 includes a variable voltage source and controls a voltage VL_V of a control line VL by the variable voltage source. More specifically, the voltage controller 130 linearly drops the voltage VL_L of the control line VL in response to deactivation of a reset signal ΦRVL. A current Ipix flowing through a transistor M3 starts flowing when the transistor M3 is turned on and increases until the change in the voltage VL_V of the control line VL stops. In this manner, an example of the voltage controller 130 for linearly changing the voltage VL_V of the control line VL is a buffer such as a voltage follower. For example, referring to FIG. 2, the voltage at the node connected to a constant current source and a first node 137 of a capacitor 132 is supplied to the control line VL via the voltage follower.

Note that the voltage of the control line VL may be controlled in a direction from the ON state to the OFF state of the transistor M3. In this manner, when the voltage of the control line VL is controlled in the direction from the ON state to the OFF state of the transistor M3, a state in which the value of the pixel current Ipix becomes smaller than the value of a reference current Iref can be expressed as a state in which the pixel current Ipix exceeds the threshold.

In each embodiment described above, a plurality of pixels may share the transistor M3. More specifically, the plurality of photoelectric converters may be connected to a common floating diffusion via different transfer transistors.

Figure 9A:
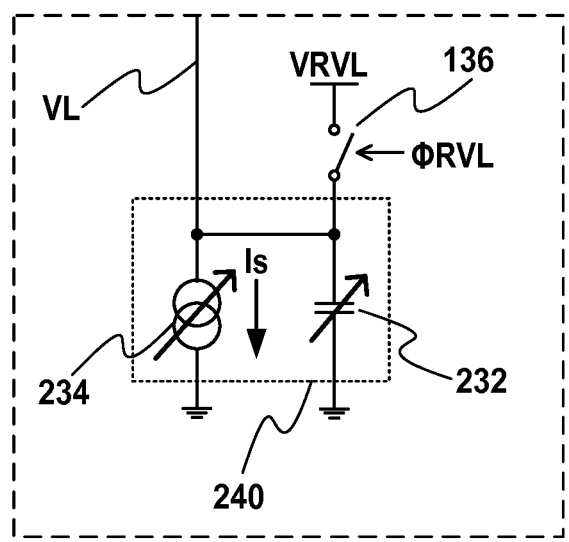
FIGS. 9A and 9B are circuit diagrams showing the arrangement of a voltage controller of a photoelectric conversion device according to the fifth embodiment.

A photoelectric conversion device according to the fifth embodiment of the present invention will be described with reference to FIG. 9A. The fifth embodiment is different from the first to fourth embodiments in that a voltage controller 130 is replaced with a voltage controller 230. Items which correspond substantially with those of the fifth embodiment will not be described.

The voltage controller 230 changes a voltage V_VL of a control line VL. The voltage controller 230 includes a variable capacitor 232, a switch 136, and a variable current source 234. The variable capacitor 232 and the variable current source 234 constitute a gain controller 240. The gain controller 240 can determine the capacitance value of the variable capacitor 232 and a current value Is in accordance with a control signal (not shown).

When the capacitance value of the variable capacitor 232 is set large, the rate of change (slope) of the voltage V_VL of the control line VL during an period A can be increased. When the capacitance value of the variable capacitor 232 is set small, the change (slope) of the voltage V_VL of the control line VL can be decreased during the period A. When the current value Is is set large, during the period A in FIG. 4, the discharge current from the variable capacitor 232 increases to increase the change (slope) of the voltage V_VL of the control line VL. When the current value Is is set small, the change (slope) of the voltage V_VL of the control line VL during the period A can be decreased.

As described above, the gain controller 240 can increase/decrease the change (slope) of the voltage V_VL of the control line VL during the period A. As will be described later, an A/D conversion gain (that is, the gain of the readout by a readout unit 120) can be switched. In this example, both the capacitance value of the variable capacitor 232 and the current value Is of the variable current source 234 are set variable. However, one of the capacitance value and the current value may be set variable to change the A/D conversion gain.

Figure 10:
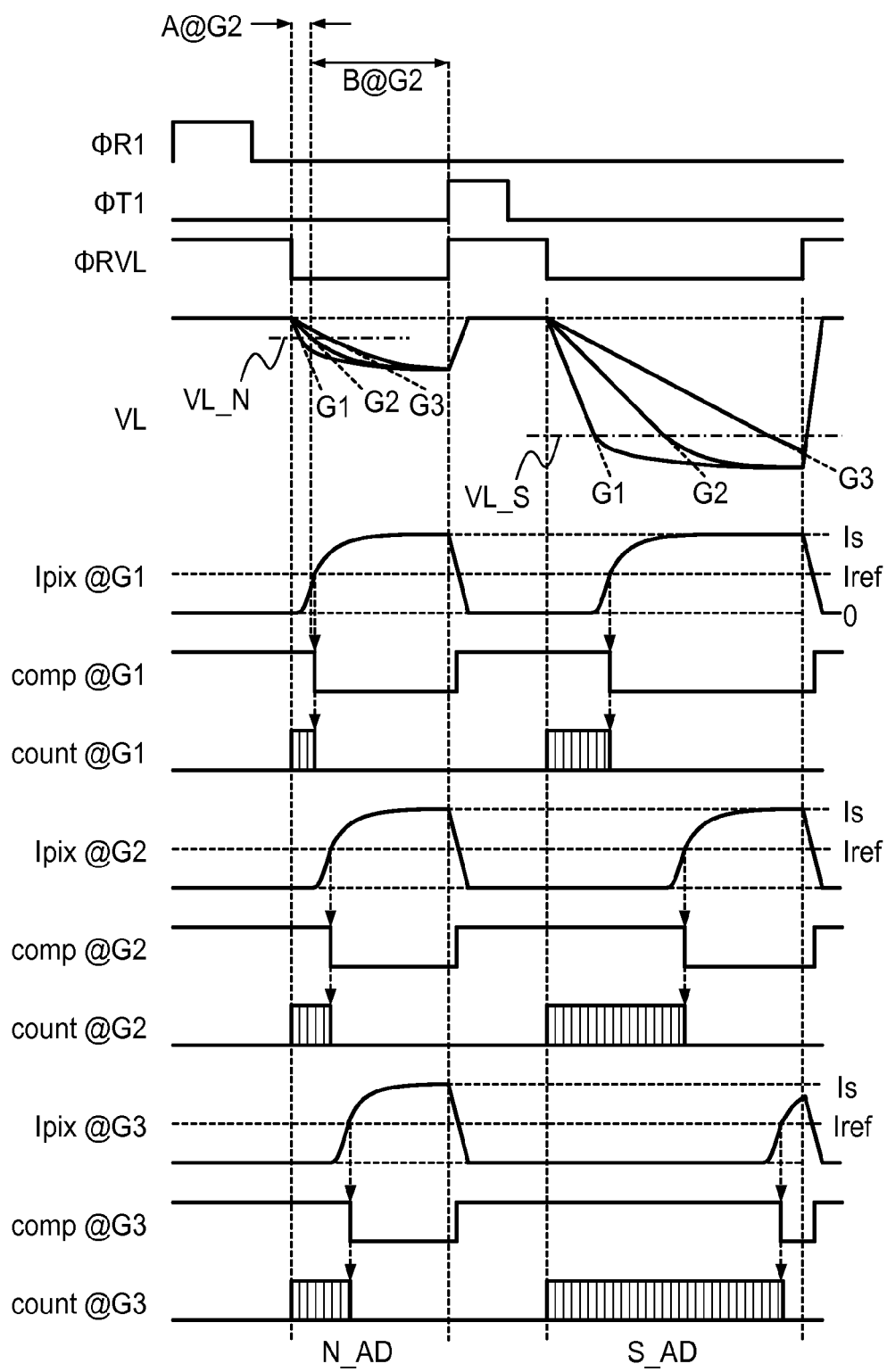
FIG. 10 is a timing chart showing the readout operation of a signal on the first row and a given column according to the fifth embodiment.

The A/D conversion gain switching in the photoelectric conversion device according to the fifth embodiment will be described with reference to FIG. 10. FIG. 10 shows three different gains G1, G2, and G3. In this case, the A/D conversion gain as in FIG. 4 is defined as G2, a gain set when the slope of the control line VL is larger than that of the gain G2 is defined as the gain G1, and a gain set when the slope is smaller than that of the gain G2 is defined as the gain G3. As described above, when at least one of the capacitance value of the variable capacitor 232 and the current value Is can be changed to determine the A/D conversion gain. The reset voltage of a charge-voltage converter FD and the charge quantity transferred from a photoelectric converter PD to the charge-voltage converter FD by activation of the transfer signal ΦT are kept unchanged for all the A/D conversion gains.

A reset signal ΦR1 is activated for a predetermined time to turn on a reset transistor M2. The voltage of the charge-voltage converter FD is reset to a reset voltage corresponding to the reset voltage VR via the reset transistor M2. Resetting of the voltage of the charge-voltage converter FD is complete by deactivation of the reset signal ΦR1. Simultaneously with resetting of the voltage of the charge-voltage converter FD, the reset signal ΦRVL is activated for a predetermined time to turn on the switch 136. The voltage V_VL of the control line VL is reset to a voltage corresponding to the reset voltage VRVL via the switch 136. The voltage at a first node 137 of the variable capacitor 232 connected to the control line VL is also reset to the voltage corresponding to the reset voltage VRVL. Resetting of the voltage V_VL of the control line VL is complete by deactivating the reset signal ΦRVL. In this case, the reset voltage VRVL (the voltage of the first voltage line) is determined such that the voltage set in the control line VL by turning on the switch 136 is a voltage not to turn on a transistor M3 of the pixel 112.

A noise level readout operation N_AD starts by deactivation of the reset signal ΦRVL. The voltage V_VL of the control line VL drops in accordance with the slope corresponding to the setting of the A/D conversion gain G1, G2, or G3. Even if one of the A/D conversion gains G1, G2, and G3 is selected, the transistor M3 is turned on when the voltage V_VL of the control line VL becomes a voltage VL_N because the voltage of the charge-voltage converter FD is kept unchanged. The pixel current Ipix starts flowing. Since the slope of the A/D conversion gain G1 is the largest, the pixel current Ipix starts flowing at the earliest timing. In the case of the lowest A/D conversion gain G3, the pixel current Ipix starts flowing at the latest timing. Ipix@G1, comp@G1, and count@G1 represent Ipix, comp, and count, respectively, when the A/D conversion gain is G1. Ipix@G2, comp@G2, and count@G2 represent Ipix, comp, and count, respectively, when the A/D conversion gain is G2. Similarly, Ipix@G3, comp@G3, and count@G3 represent Ipix, comp, and count, respectively, when the A/D conversion gain is G3.

In an optical signal readout operation S_AD, similarly, the pixel current Ipix starts flowing at a timing at which the voltage V_VL of the control line VL becomes VL_S. Similarly, the pixel current Ipix starts flowing at the earliest timing for the A/D conversion gain G1; and at the latest timing for the A/D conversion gain G3. A comparison result signal comp is inverted at a timing at which the value of the pixel Ipix exceeds the value of a reference current Iref at each time and each gain. A digital value as the count value at this timing is held in the memory 126.

To hold the count value at the earliest timing for the A/D conversion gain G1 means the smallest value of the digital signal for the A/D conversion gain G1. To hold the count value at the latest timing for the A/D conversion gain G3 means the largest value of the digital signal for the A/D conversion gain G3. If the A/D conversion gain is defined as (value of digital signal)/(voltage level in charge-voltage converter), the relation between the A/D conversion gain and the slope of a voltage V_BL of the control line VL is given by $$G1(\text{gain:low,slope:large}) < G2(\text{gain:medium,slope:medium}) < G3(\text{gain:high,slope:small})$$

That is, the gain controller 240 provides a function of switching the A/D conversion gains by the readout unit 120.

Figure 9B:
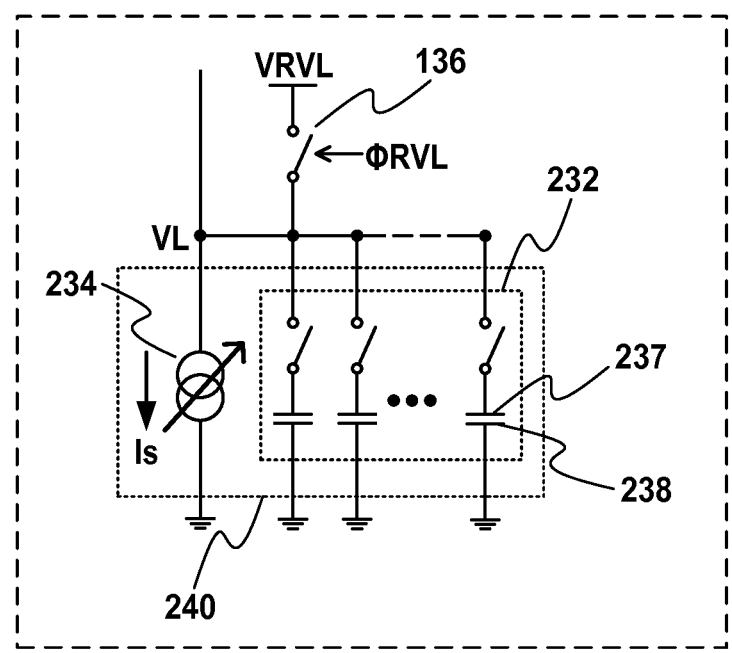

FIG. 9B shows an example of the detailed arrangement of the gain controller 240. In the example shown in FIG. 9B, the variable capacitor 232 is formed from a parallel connection of a plurality of units. Each unit is formed from a series connection of a capacitor and a selecting switch. Control of the state (ON or OFF) of the selecting switch makes it possible to determine the capacitance value of the variable capacitor 232. More specifically, by controlling the state (ON or OFF) of the selecting switch, the capacitor used for voltage control of the control line VL can be selected from a plurality of capacitors.

When the capacitor of each unit is formed from a device using a silicon diffusion layer like a MOS capacitor, a parasitic capacitance is generated between the diffusion layer and the well in one of two electrodes 237 and 238 of the capacitor. When each capacitor is arranged between the switch and the control line VL, regardless of the ON or OFF of the switch, the parasitic capacitances of all the capacitors are always added to the control line VL. In this case, a desired gain may not be obtained when the A/D conversion gain is set by the gain controller 240. Like the example shown in FIG. 9B, the switch is inserted between the capacitor and the control line VL to disconnect, from the control line VL, the parasitic capacitance of the capacitor to which the OFF switch is connected. With this arrangement, an error component caused by the parasitic capacitance can be minimized, and more accurate A/D conversion gain setting can be performed.

Figure 11:
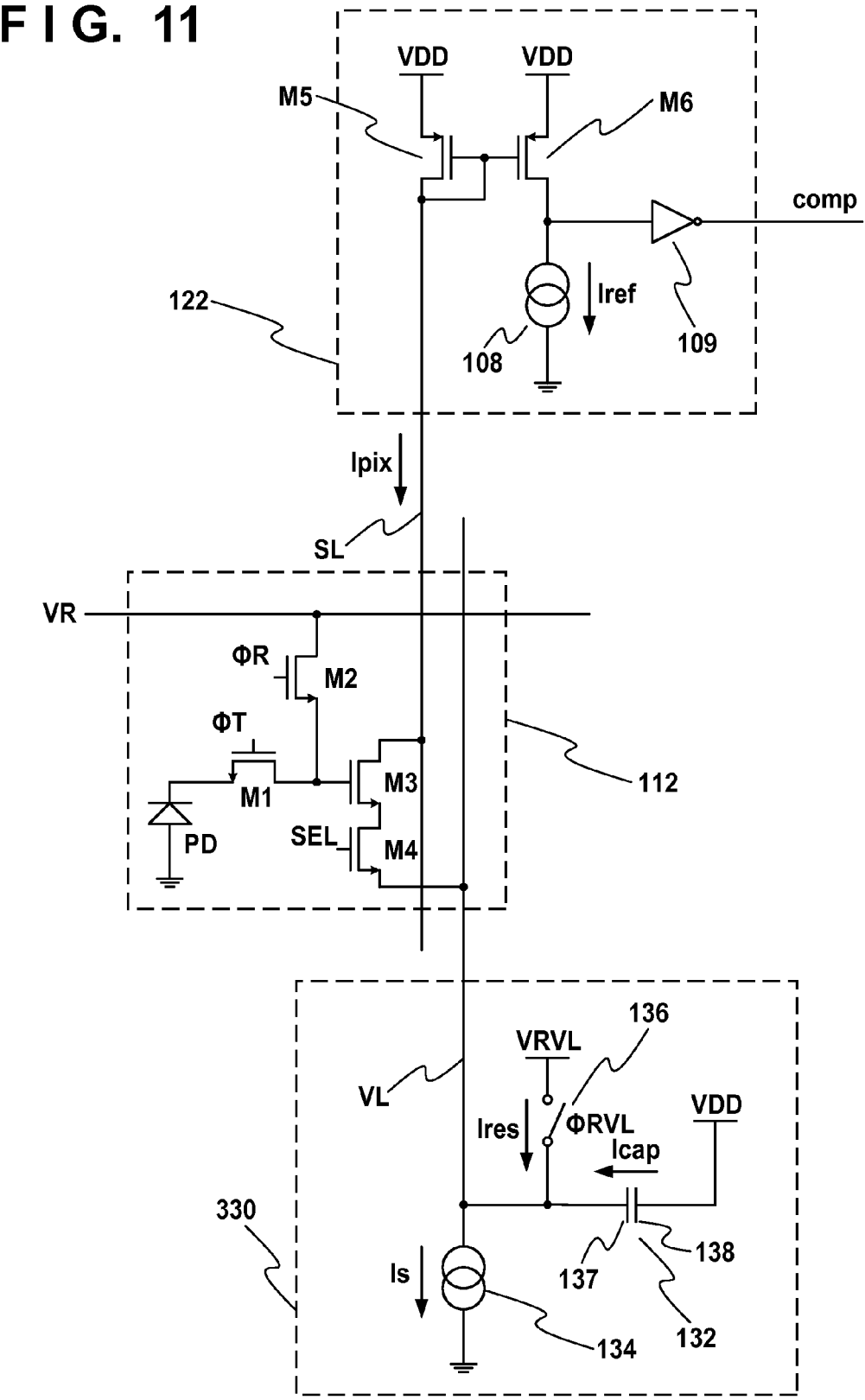
FIG. 11 is a circuit diagram showing the arrangement of a photoelectric conversion device according to the sixth embodiment.

A photoelectric conversion device according to the sixth embodiment of the present invention will be described with reference to FIG. 11. For the descriptive simplicity, FIG. 11 representatively shows a comparator 122 and a voltage controller 330 for a given column, and one pixel 112 for the given column. In the sixth embodiment, the voltage controller 130 is replaced with the voltage controller 330.

The voltage controller 330 is different from the voltage controller 130 in that a second electrode 138 of a capacitor 132 is connected to a third voltage line (in this example, a power supply voltage line which supplies a power supply voltage VDD). The voltage of the third voltage line is equal to the power supply voltage VDD to be supplied to the sources of transistors M5 and M6 of the comparator 122. The voltage controller 330 shown in FIG. 11 has no function of changing the A/D conversion gain. However, as in the fifth embodiment, the voltage controller 330 may have a function of changing the A/D conversion gain.

FIG. 12A shows an operation, as a comparative example, of an arrangement in which the second electrode 138 of the capacitor 132 is connected to the second voltage line (ground voltage line) as in the first to fifth embodiments. FIG. 12B shows an operation of an arrangement of the sixth embodiment, that is, the arrangement in which the second electrode 138 is connected to the third voltage line (in this example, the power supply voltage line which supplies the power supply voltage VDD).

A current Icap flows from the capacitor 132, and a current Ires flows through the switch 136. The current Icap is positive when it flows from the second electrode 138 of the capacitor 132 to a first electrode 137. Since the basic operation of the waveforms in a noise level readout operation N_AD is the same as in an optical signal level readout operation S_AD, only the operation S_AD is illustrated.

Referring to FIG. 12A, a current Ivdd supplied from the third voltage line is the sum of a pixel current Ipix and a reference current Iref. The current Icap is the discharge current from the capacitor 132 after deactivation of ΦRVL and is supplied from the second voltage line (ground voltage line) via the second electrode 138. A current Ignd flowing into the second voltage line is obtained by subtracting Icap from the sum of the current source current Is and Iref. As can be obvious from FIG. 12A, it is obvious that Ivdd and Ignd greatly fluctuate during the period of S_AD in which A/D conversion is being performed. Since the second voltage line and the third voltage line have corresponding impedances, the current fluctuations of these voltage lines cause fluctuations of the ground voltage and the power supply voltage. The circuit arrangement of one column is illustrated in FIG. 11. However, if the photoelectric conversion device includes a plurality of columns, the fluctuations of the ground voltage and the power supply voltages caused by columns other than the self column which is performing A/D conversion generate a noise component.

In the example of FIG. 12B, since the second electrode 138 of the capacitor 132 is connected to the third voltage line, Ivdd becomes the sum of Ipix, Iref, and Icap, and Ignd becomes the sum of Is and Iref. Since Icap and Ipix have opposite phases, their sum can cancel the current fluctuation, thereby suppressing the Ivdd fluctuation. Since Ignd is not correlated with Icap which has a large fluctuation, the Ignd fluctuation can also be suppressed. Accordingly, in the photoelectric conversion device having a plurality of columns, the fluctuations of the ground voltage and the power supply voltage caused by the operations of columns other than the self column during the A/D conversion period can be suppressed. As compared with the case in which the second electrode 138 of the capacitor 132 is connected to the second voltage line, image quality degradation caused by the noise can be reduced.

As described above, the second electrode 138 of the capacitor 132 connected to a control line VL is connected to the third voltage line connected to transistors M5 and M6 of the comparator 122, thereby reducing the image quality degradation caused by the noise.

Figure 13:
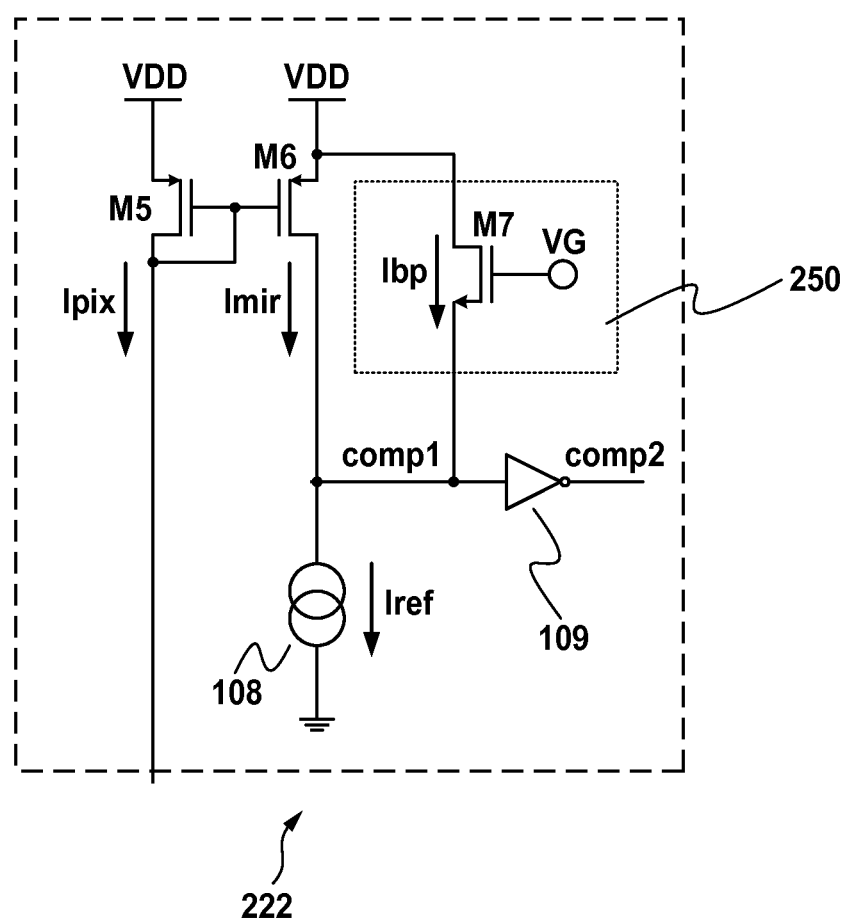
FIG. 13 is a circuit diagram showing the arrangement of a comparator of a photoelectric conversion device according to the seventh embodiment.

A photoelectric conversion device according to the seventh embodiment of the present invention will be described with reference to FIG. 13. In the seventh embodiment, the comparator 122 of the first to sixth embodiments is replaced with a comparator 222. The comparator 222 has an arrangement in which a bypass path 250 is added to the arrangement of the comparator 122. The bypass path 250 is arranged parallel to a transistor M6 so as to bypass a path between the source and drain of the transistor M6. The bypass path 250 is formed from an NMOS transistor M7 having the gate to which a predetermined voltage VG is applied, the drain connected to a third voltage line (in this example, a power supply voltage line to which a power supply voltage VDD is supplied), and the source connected to a current source 108 (input node comp1). An inverter 109 has the input node comp1 and an output node comp2.

The operation of the photoelectric conversion device according to the seventh embodiment will be described with reference to FIG. 14 centered on points different from the operation shown in FIG. 4. A current Imir flows through the transistor M6. A current Ibp flows through the transistor M7 (the bypass path 250). A reference current Iref flows through the current source 108.

During a period A of a readout operation N_AD, a voltage V_VL of a control line VL drops linearly. However, since a transistor M3 of a pixel 112 on a readout target row is OFF, a pixel current Ipix does not flow. A transistor M5 and the transistor M6 constitute a current mirror. Accordingly, the current Imir does not flow during the period A. When the predetermined voltage VG is set such that the transistor M7 is turned on, the reference current Iref of the current source 108 flows via the transistor M7. At this time, the voltage of the node comp1 is a voltage obtained by subtracting a threshold voltage VT7 of the transistor M7 from almost the predetermined voltage VG. It is preferable that the predetermined voltage VG is set such that a voltage VG-VT7 is higher than the ground voltage and lower than the inverting threshold of the inverter 109.

When the voltage V_VL of the control line VL continuously drops, a transistor M3 is turned on soon to start flowing the pixel current Ipix. The current Imir corresponding to a size ratio of the transistors M5 and M6 flows via the transistor M6. The transistors M6 and M7 are connected to the current source 108, and the sum of currents flowing through the transistors M6 and M7 is Iref. The current Ibp gradually decreases, and the voltage of the node comp1 rises. The pixel current Ipix increases, and the current Ibp becomes zero at a timing at which the current Imir becomes equal to the reference current Iref. After that, the current Imir becomes temporarily higher than the reference current Iref to charge the parasitic capacitance of the node comp1 with the charges corresponding to the difference between Imir and Iref, thereby increasing the voltage of the node comp1. When the voltage of the node comp1 rises, the voltage between the drain and source of the transistor M6 becomes low. The current Imir gradually decreases and is balanced to be equal to the same value as that of the reference current Iref.

During an period in which the voltage of the node comp1 rises, the voltage of the node comp2 is inverted when the voltage of the node comp1 exceeds the inverting threshold of the inverter 109, and a count value count at this time is held in a memory 126. After that, the readout operation N_AD is complete, and a reset signal ΦRVL is activated, thereby turning off the transistor M3. The current Ipix stops flowing. At this time, Imir does not flow either. Instead, the current Ibp supplies the current of the current source 108, and the voltage of the node comp1 returns to VG-VT7. Subsequently, the operation of a readout operation S_AD is the same as N_AD, and a description thereof will be omitted.

The current Ibp flows via the bypass path 250 (the transistor M7) during an period in which the pixel current Ipix does not flow, so that the current flowing through the ground voltage line is made constant. When the voltage of the node comp1 on the low-voltage side is set to VG-VT7 higher than the ground voltage, the amplitude of the voltage change at the node comp1 is limited. In a photoelectric conversion device having a plurality of columns and an inter-column pitch smaller than several µ, the self column is adversely affected by large-amplitude signals of the remaining columns, which are caused by the crosstalk. This can become noise to cause image quality degradation. More specifically, the amplitude of the voltage change at the node comp1 is limited to suppress image quality degradation.

Figure 14:
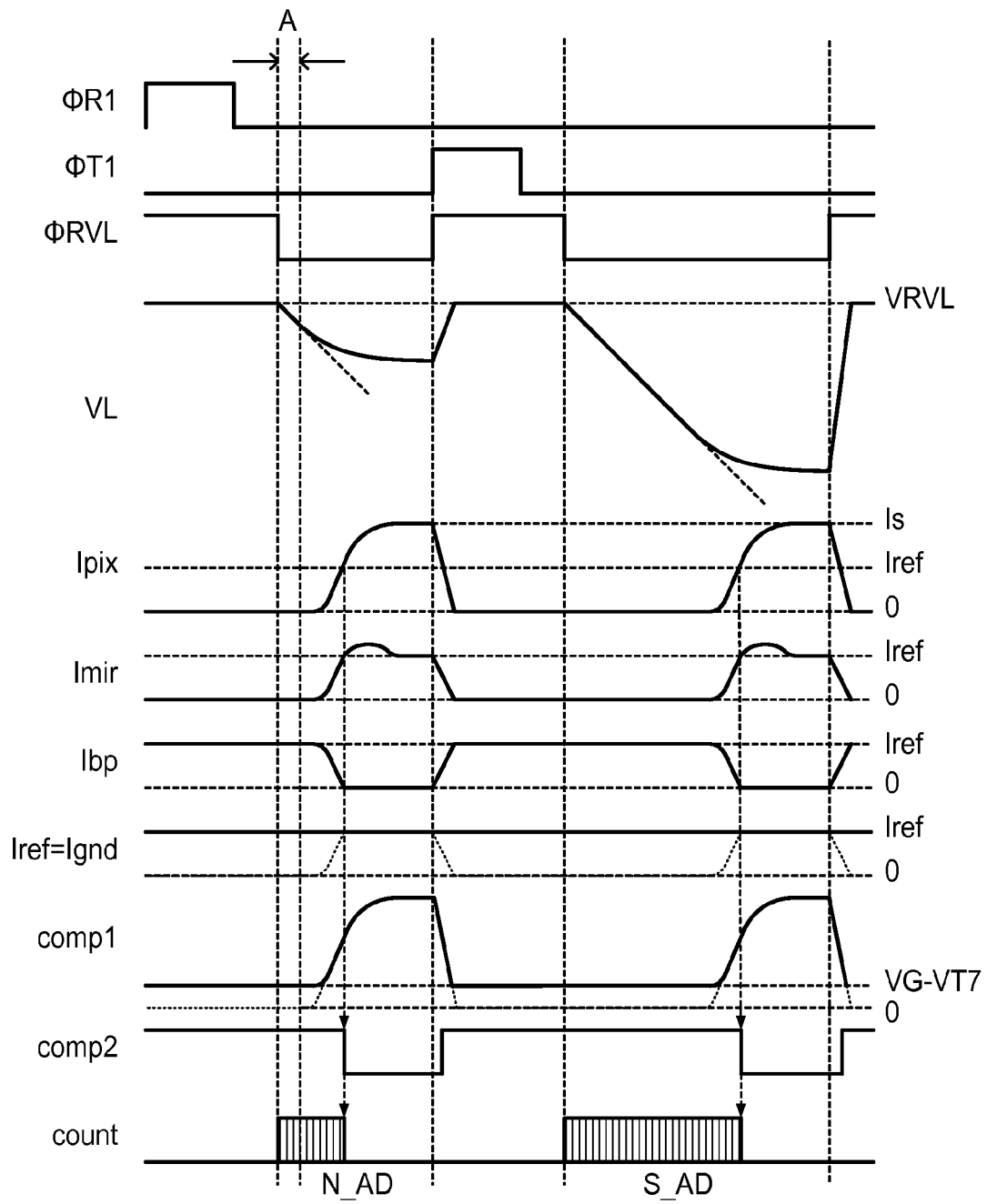
FIG. 14 is a timing chart showing the readout operation of a signal on the first row and a given column according to the seventh embodiment.

FIG. 14 shows dotted waveforms of a reference current Iref (that is, a current Ignd flowing to the ground voltage line) in the absence of the bypass path 250 and the voltage at the node comp1. The currents flowing through the ground voltage line during the periods of the readout operations N_AD and S_AD which perform A/D conversion operations fluctuate due to the absence of the bypass path 250. Since the ground voltage line has the corresponding impedance, the current fluctuation causes the fluctuation of the ground voltage. However, if the photoelectric conversion device includes a plurality of columns, the fluctuation of the ground voltage caused by columns other than the self column which is performing A/D conversion generates a noise component. This causes image quality degradation. More specifically, the fluctuation of the current flowing through the ground voltage line is suppressed by the bypass path, thereby suppressing the image quality degradation.

A photoelectric conversion device according to the eighth embodiment of the present invention will be described with reference to FIG. 15. In the eighth embodiment, the comparator 122 of the first to sixth embodiments is replaced with a comparator 322. The comparator 322 has an arrangement obtained by adding an amplitude limiter 350 to the arrangement of the comparator 122. The amplitude limiter 350 limits the amplitude of the voltage at a node comp1. The amplitude limiter 350 is formed from, for example, an NMOS transistor M8 having the gate to which a voltage VG2 is applied, the drain connected to the drain of a transistor M6, and the source connected to a current source 108.

Figure 16:
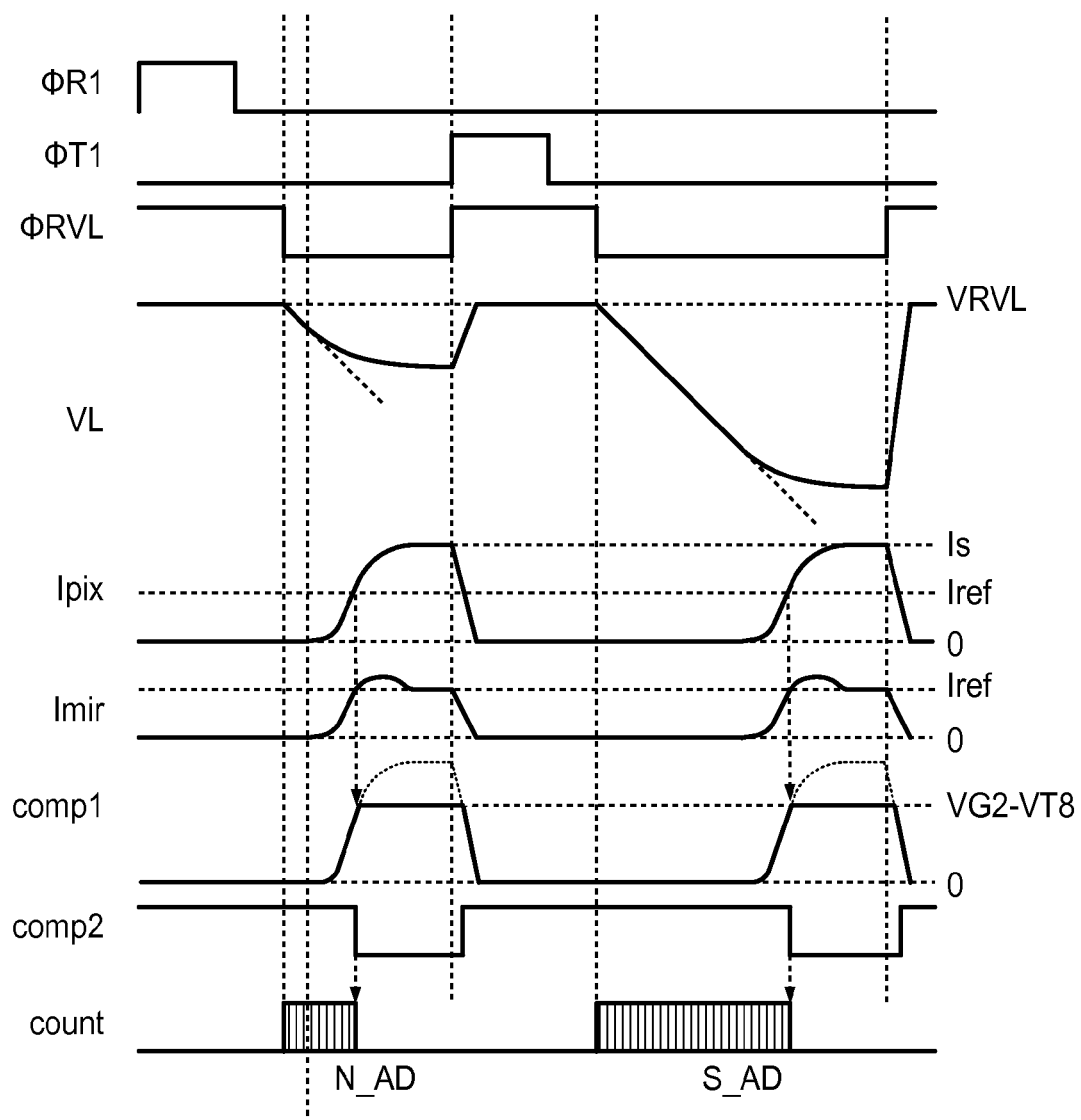
FIG. 16 is a timing chart showing the readout operation of a signal on the first row and a given column according to the eighth embodiment.

Next, the operation of the photoelectric conversion device according to the eighth embodiment will be described with reference to FIG. 16 centered on points different from the operation shown in FIG. 4. The operation from when a readout operation N_AD starts to turn on a transistor M3 of a pixel 112 on the read target row until a pixel current Ipix starts flowing is the same as in FIG. 4. However, when the pixel current Ipix flows, a current Imir corresponding to the size ratio of a transistor M5 and the transistor M6 flows. Accordingly, the voltage of the node comp1 gradually rises. If the threshold of the transistor M8 is defined as VT8, the voltage of the node comp1 becomes about VG2-VT8, thereby suppressing the voltage of the node comp1 on the high-voltage side. That is, the amplitude of the voltage at the node comp1 is limited. In a photoelectric conversion device having a plurality of columns and an inter-column pitch smaller than several µ, the self column is adversely affected by large-amplitude signals of the remaining columns, which are caused by the crosstalk. This can become noise to cause image quality degradation. More specifically, the amplitude of the voltage change at the node comp1 is limited to suppress image quality degradation. The voltage VG2 is set such that VG2-VT8 is higher than the inverting threshold of the inverter 109 so as to invert an inverter 109.

Figure 15:
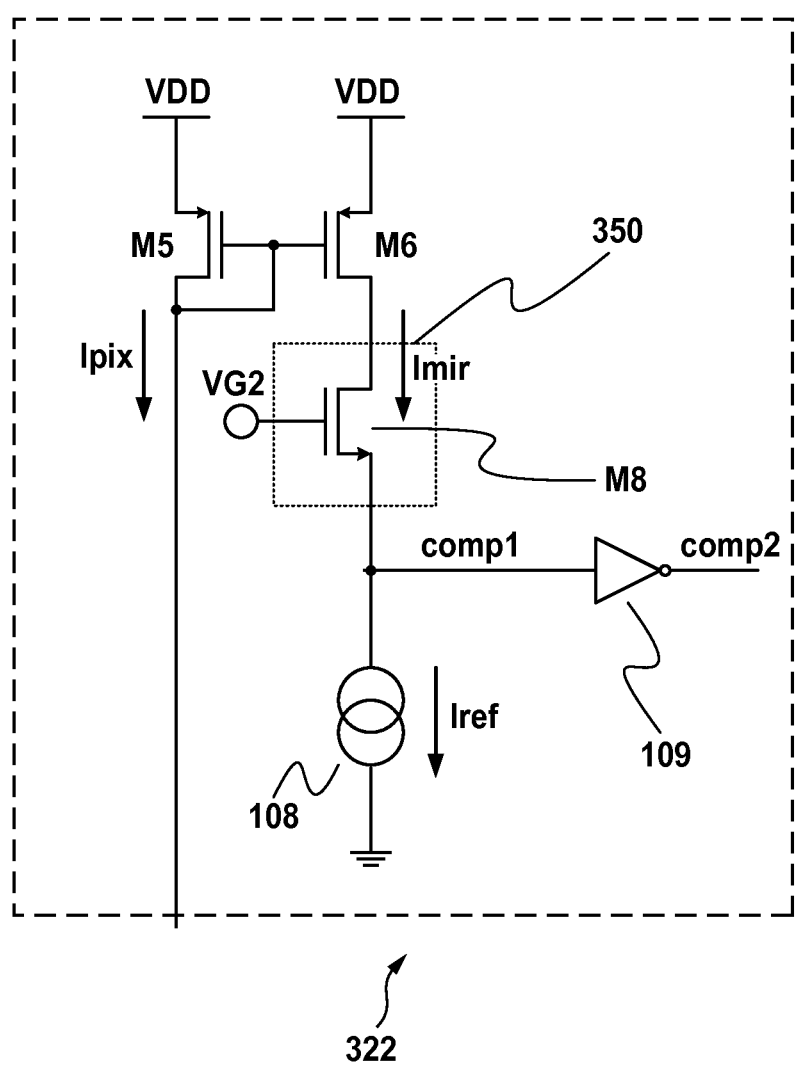
FIG. 15 is a circuit diagram showing the arrangement of a comparator of a photoelectric conversion device according to the eighth embodiment.

In the example shown in FIG. 15, although the voltage VG2 is applied to the gate of the transistor M8, an enable signal line for controlling the comparator 322 in the operating or non-operating state may be connected to the gate of the transistor M8. When the enable signal is active (high level), the comparator 322 is operated. When the enable signal is inactive (low level), the current path of the comparator 322 is cut off. The comparator 322 is set in the non-operating state to suppress the power consumption.

Figure 17:
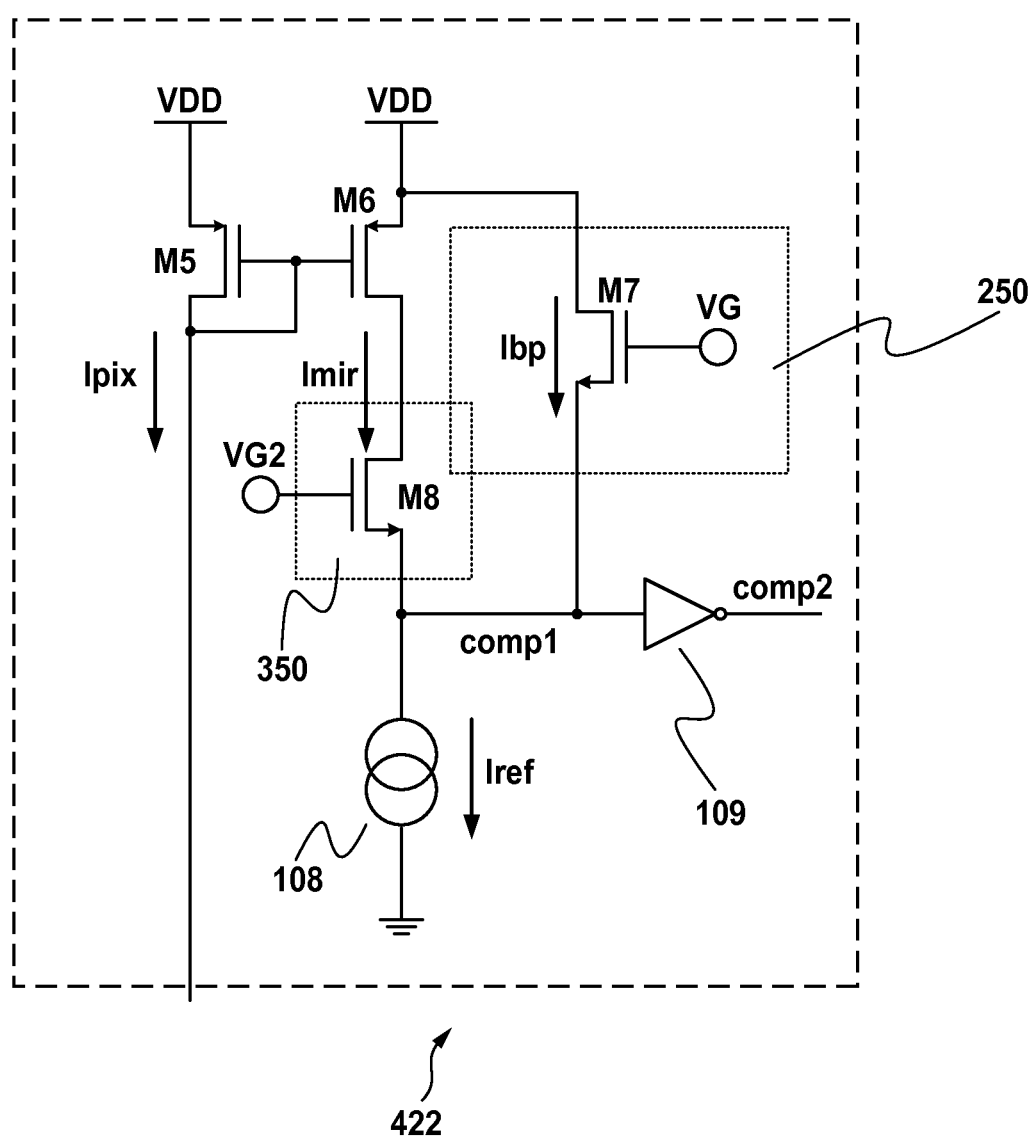
FIG. 17 is a circuit diagram showing the arrangement of a comparator of a photoelectric conversion device according to the ninth embodiment.

A photoelectric conversion device according to the ninth embodiment of the present invention will be described with reference to FIG. 17. In the eighth embodiment, the comparator 122 of the first to sixth embodiments is replaced with a comparator 422. The comparator 422 has an arrangement in which the bypass path 250 of the seventh embodiment and the amplitude limiter 350 of the eighth embodiment are incorporated.

Figure 18:
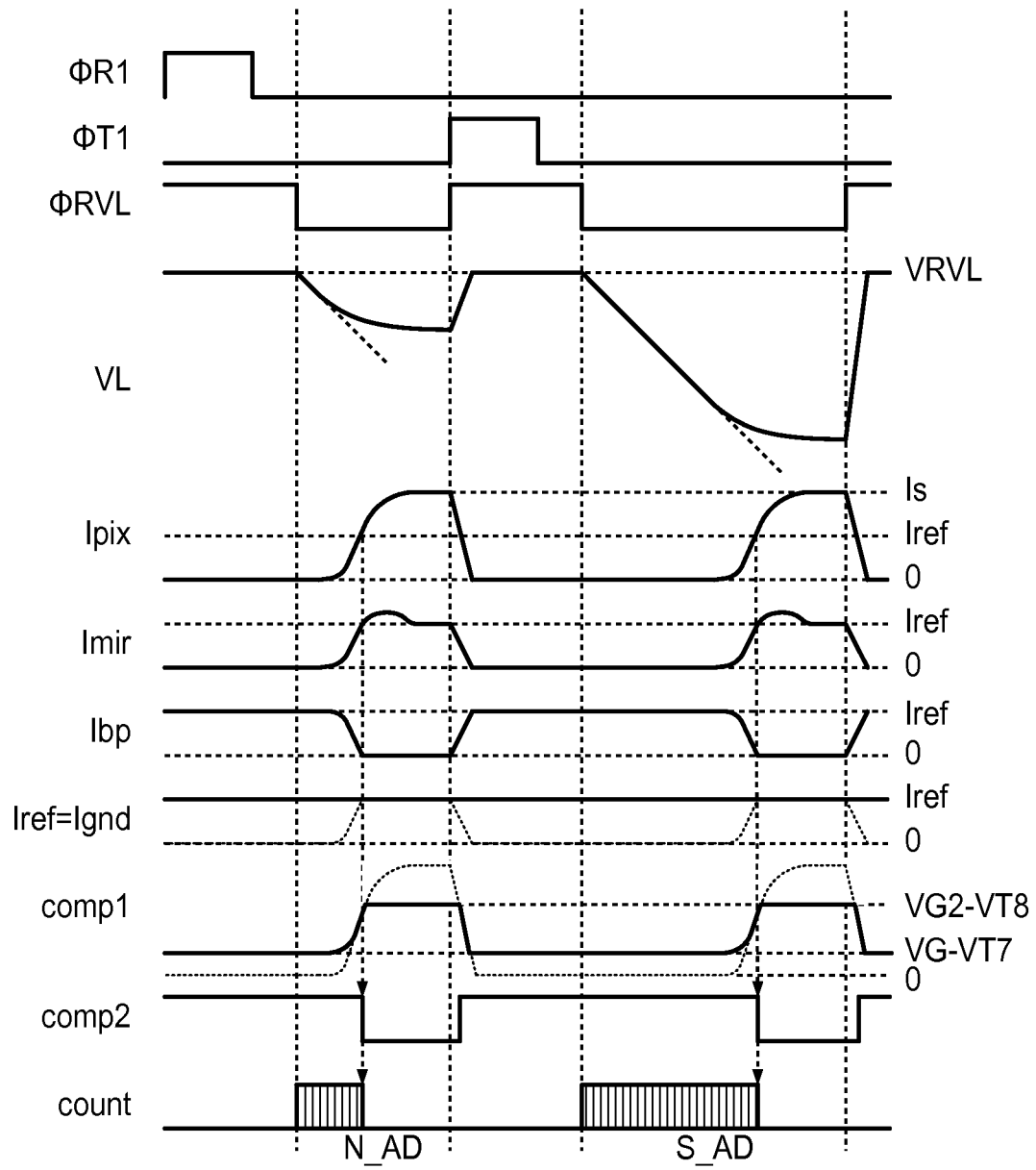
FIG. 18 is a timing chart showing the readout operation of a signal on the first row and a given column according to the ninth embodiment.

FIG. 18 shows the operation of the photoelectric conversion device according to the ninth embodiment. Since the photoelectric conversion device includes the bypass path 250 and the amplitude limiter 350, a current Ignd flowing through the ground voltage line is set constant, and at the same time the amplitude of the voltage at a node comp1 is limited to VG2-VT8 to VG-VT7. More specifically, in a photoelectric conversion device having a plurality of columns, image quality degradation caused by a ground voltage fluctuation and image quality degradation caused by the crosstalk of a large-amplitude signal can be suppressed.

Figure 19:
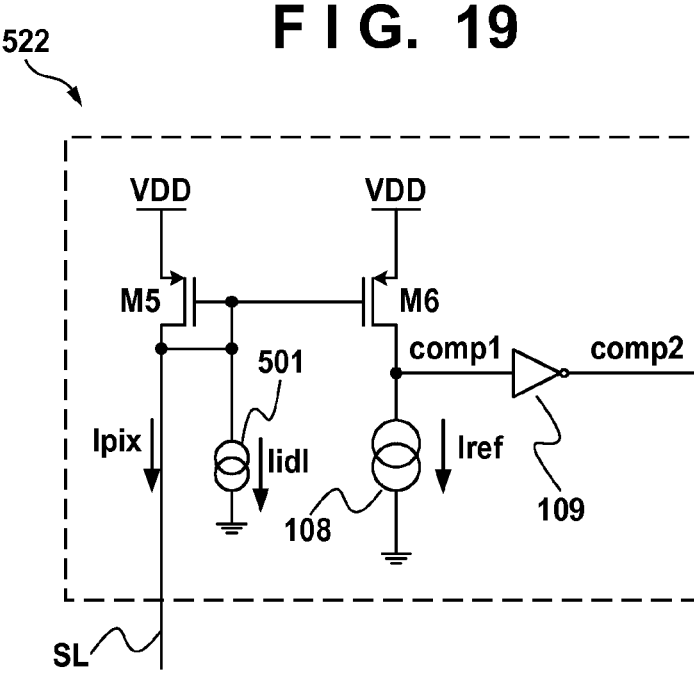
FIG. 19 is a circuit diagram showing the arrangement of a comparator of a photoelectric conversion device according to the 10th embodiment.

A photoelectric conversion device according to the 10th embodiment of the present invention will be described with reference to FIG. 19. In the 10th embodiment, the comparator 122 of the first to sixth embodiments is replaced with a comparator 522. The comparator 522 has an arrangement in which an idle current source 501 for flowing an idle current Iidl is added to the comparator 122.

The operation of the photoelectric conversion device according to the 10th embodiment will be described with reference to FIG. 20 centered on points different from the operation shown in FIG. 4. A reset signal ΦRVL is activated to turn off a transistor M3. A current Ipix stops flowing, and a current flowing through a transistor M5 is only the idle current Iidl. In this state, since the parasitic capacitance of a sensing line SL is charged with the idle current Iidl, the voltage of the sensing line SL rises. If the gate-source voltage of the transistor M5 is defined as Vgs, the voltage of the sensing line SL is settled to VDD-Vgs. A current having an amplitude obtained by multiplying the idling current Iidl by the size ratio M (=(gate width of M6)/(gate width of M5)) to M6 flows to a transistor M6. In the embodiments, the gate length of the transistor M5 and the gate length of the transistor M6 are equal to each other. The voltages of a control line VL and the sensing line SL are settled. At the same time the reset signal ΦRVL is made inactive after the completion of the pixel reset operation or transfer operation, thereby starting the A/D conversion operation. Since the subsequent operations is the same as that of the embodiments described above, and a detailed description thereof will be omitted.

The idle current Iidl must be a current value satisfying the following expression:

$$Iidl < Iref/M$$

Figure 20:
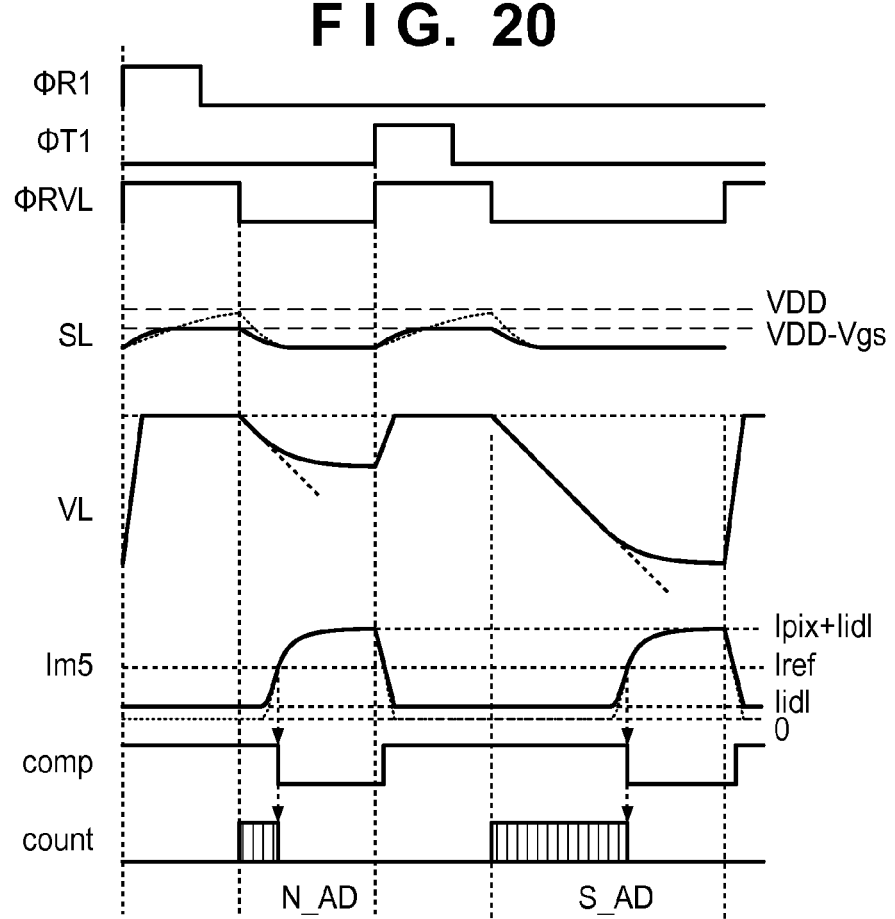
FIG. 20 is a timing chart showing the readout operation of a signal on the first row and a given column according to the 10th embodiment.

FIG. 20 shows that the voltage waveform of the sensing line SL and a current waveform Im5 flowing through the transistor M5 are indicated by dotted lines in the absence of the idle current source 501. When the reset signal ΦRVL is activated in the absence of the idle current source 501, a current determined by the gate-source voltage Vgs of the transistor M5 is supplied to the transistor M5 to charge the parasitic capacitance of the sensing line SL. The voltage of the sensing line SL accordingly rises. Along with the rise of the sensing line SL, the gate-source voltage decreases. For this reason, the current supplied to the transistor M5 also decreases to lower the rise rate of the voltage of the sensing line SL. When Vgs becomes lower than the threshold voltage of the transistor M5, the voltage of the transistor M5 falls within the sub-threshold region to exponentially decrease the current amount supplied to the transistor M5. It takes a long time to settle the sensing line SL because the current of the transistor M5 is cut off and the voltage of the sensing line SL must reach VDD.

When starting the A/D conversion operation in a state in which the sensing line SL is not sufficiently settled, the source-drain voltage of the transistor M3 in the initial state of each A/D conversion operation may change. For this reason, the A/D conversion results pose problems such as linearity degradation and increases in fixed pattern noise and random noise, thereby causing image quality degradation. To obtain a good image quality, a time for sufficiently settling the sensing line SL must be ensured.

More specifically, an idle current source 501 is added as in the 10th embodiment to shorten the settling time of the sensing line SL, thereby shortening the readout time of the photoelectric conversion device.

Figure 8:
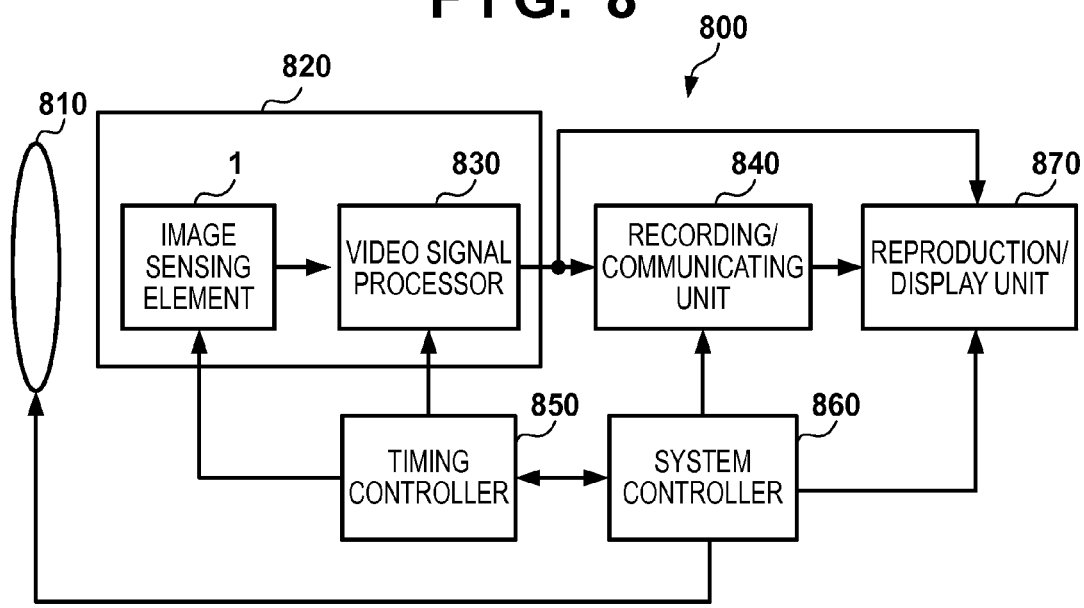
FIG. 8 is a block diagram showing the arrangement of an image sensing system according to an exemplary embodiment.

FIG. 8 shows the arrangement of an image sensing system according to still another embodiment of the present invention. An image sensing system 800 includes, for example, an optical unit 810, an image sensing element 1, a video signal processor 830, a recording/communicating unit 840, a timing controller 850, a system controller 860, and a reproduction/display unit 870. An image sensor 820 includes the image sensing element 1 and the video signal processor 830. The image sensing element 1 is a solid-state image sensor represented by the photoelectric conversion device 100, 100', or 100" described in the above embodiments.

The optical unit 810 serving as an optical system such as a lens focuses light from an object on a pixel unit 10, of the image sensing element 1, in which a plurality of pixels are arrayed two-dimensionally, thereby forming an object image. At a timing based on a signal from the timing controller 850, the image sensing element 1 outputs a signal corresponding to the light focused on the pixel unit 10. The signal output from the image sensing element 1 is input to the video signal processor 830. The video signal processor 830 performs signal processing in accordance with a method determined by a program or the like. The signal obtained by processing in the video signal processor 830 is sent to the recording/communicating unit 840 as image data. The recording/communicating unit 840 sends a signal for forming an image to the reproduction/display unit 870. The reproduction/display unit 870 reproduces and displays a moving or still image. The recording/communicating unit 840 receives a signal from the video signal processor 830 to communicate with the system controller 860 and record the signal for forming an image on a recording medium (not shown).

The system controller 860 comprehensively controls the operation of the image sensing system and controls driving of the optical unit 810, the timing controller 850, the recording/communicating unit 840, and the reproduction/display unit 870. The system controller 860 includes, for example, a storage device (not shown) as the recording medium. Programs and the like necessary for controlling the operation of the image sensing system are recorded on the storage unit. The system controller 860 supplies a signal for switching a driving mode in accordance with, for example, a user operation to the image sensing system. The detailed examples are a change in row to be read out, a change in row to be reset, a change in angle of view for electronic zooming, and a shift of the angle of view for electronic anti-vibration. The timing controller 850 controls the driving timings of the image sensing element 1 and the video signal processor 830 based on the system controller 860.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-073736, filed Mar. 31, 2014, 2014-163939, filed Aug. 11, 2014, and 2014-263355, filed Dec. 25, 2014, which are hereby incorporated by reference herein in their entirety.

What is claimed is:

1. A photoelectric conversion device comprising:
   a photoelectric converter included in a pixel;
   a transistor included in the pixel and having a gate, a first main electrode and a second main electrode, a voltage corresponding to charges generated by the photoelectric converter being supplied to the gate;
   a control line connected to the first main electrode of the transistor;
   a voltage controller configured to change a voltage of the control line; and
   a readout unit configured to generate a digital signal corresponding to a voltage of the gate, based on a current flowing through the second main electrode of the transistor in which in a state that the pixel is selected and the voltage controller changes the voltage of the control line.

2. The device according to claim 1, wherein in the state, the voltage controller changes the voltage of the control line so that a voltage between the gate and the first main electrode increases.

3. The device according to claim 2, wherein the readout unit generates the digital signal in response to a timing at which a value of a current flowing through the second main electrode exceeds a threshold.

4. The device according to claim 3, wherein the readout unit includes:
   a comparator configured to detect that the value of the current flowing through the second main electrode of the transistor exceeds the threshold, and
   a counter, and
   wherein a value of the digital signal is determined in accordance with a count value of the counter in response to detection by the comparator.

5. The device according to claim 1, wherein the voltage controller includes:
   a switch arranged in a path between the control line and a first voltage line, and
   a current source arranged in a path between the control line and a second voltage line.

6. The device according to claim 5, wherein the voltage controller further includes a capacitor connected to the control line.

7. The device according to claim 5, wherein the control line has a parasitic capacitance.

8. The device according to claim 1, wherein the voltage controller includes:
a capacitor having a first node connected to the control line,
a switch arranged in a path between a first voltage line and the first node of the capacitor, and
a current source arranged in a path between a second voltage line and the first node of the capacitor, and
wherein after the capacitor is charged in accordance with a voltage supplied from the first voltage line by turning on the switch, the readout unit generates the digital signal in accordance with a time from a timing at which the switch is turned off to a timing at which a value of a current flowing through the second main electrode of the transistor exceeds a threshold.

9. The device according to claim 1, wherein the control line has a parasitic capacitance,
wherein the voltage controller includes:
a switch arranged in a path between the control line and a first voltage line, and
a current source arranged in a path between the control line and a second voltage line, and
wherein after the parasitic capacitance is charged in accordance with a voltage supplied from the first voltage line by turning on the switch, the readout unit generates the digital signal in accordance with a time from a timing at which the switch is turned off to a timing at which a value of a current flowing through the second main electrode of the transistor exceeds a threshold.

10. The device according to claim 8, wherein the gate of the transistor is connected to a charge-voltage converter,
wherein the device further comprises:
a transfer transistor configured to transfer charges generated by the photoelectric converter to the charge-voltage converter, and
a reset transistor configured to reset a voltage of the charge-voltage converter, and
wherein after resetting of the voltage of the charge-voltage converter by the reset transistor is complete and setting of the voltage of the control line by the switch is complete, the readout unit generates, as a signal indicating a noise level, a digital signal corresponding to the voltage of the gate in response to a timing at which a value of a current flowing through the second main electrode of the transistor exceeds the threshold, and then after the transfer transistor transfers the charges from the photoelectric converter to the charge-voltage converter and setting of the voltage of the control line by the switch is complete, the readout unit generates, as a signal indicating an optical signal level, a digital signal corresponding to the voltage of the gate in response to a timing at which the value of the current flowing through the second main electrode of the transistor exceeds the threshold.

11. The device according to claim 5, wherein the voltage of the first voltage line is determined so that the voltage set in the control line by turning on the switch is a voltage which does not turn on the transistor.

12. The device according to claim 1, further comprising a selecting transistor arranged in a path between the control line and the first main electrode of the transistor.

13. The device according to claim 1, further comprising a plurality of photoelectric converters including the photoelectric converter and a plurality of transistors including the transistor,
wherein the control line is connected to first main electrodes of the plurality of transistors, and
wherein the readout unit is connected to second main electrodes of the plurality of transistors.

14. The device according to claim 1, wherein the voltage controller has a function of switching a readout gain of the readout unit by switching a rate of a voltage change of the control line in the state.

15. The device according to claim 1, wherein the voltage controller includes:
a switch arranged in a path between a first voltage line and the control line, and
a variable current source arranged in a path between a second voltage line and the control line, and
wherein a rate of a voltage change of the control line in the state is switched by switching a value of a current of the variable current source, thereby switching a readout gain of the readout unit.

16. The device according to claim 1, wherein the voltage controller includes:
a switch arranged in a path between the control line and a first voltage line,
a current source arranged in a path between the control line and a second voltage line, and
a variable capacitor connected to the control line, and
wherein a rate of a voltage change of the control line in the state is switched by switching a capacitance value of the variable capacitor, thereby switching a readout gain of the readout unit.

17. The device according to claim 16, wherein the variable capacitor includes a plurality of capacitors and a plurality of selecting switches configured to select a capacitor used for voltage control of the control line from the plurality of capacitors.

18. The device according to claim 17, wherein the plurality of switches are arranged in paths between the control line and the plurality of capacitors.

19. The device according to claim 1, wherein the voltage controller includes:
a switch arranged in a path between the control line and a first voltage line,
a variable current source arranged in a path between the control line and a second voltage line, and
a variable capacitor connected to the control line, and
wherein a rate of a voltage change of the control line in the state is switched by switching a value of a current from the variable current source and switching a capacitance value of the variable capacitor, thereby switching a readout gain of the readout unit.

20. The device according to claim 1, wherein the voltage controller includes:
a capacitor having a first node connected to the control line, and a second node,
a switch arranged in a path between a first voltage line and the first node of the capacitor, and
a current source arranged in a path between a second voltage line and the first node of the capacitor,
wherein a power supply voltage is supplied to the second node of the capacitor,
wherein the power supply voltage is supplied to the readout unit to operate the readout unit, and
wherein after the switch is turned on to charge the capacitor with the power supply voltage, the readout unit generates the digital signal in accordance with a time from a timing at which the switch is turned off to a timing at which a value of a current flowing through the second main electrode of the transistor exceeds a threshold.

21. The device according to claim 4, wherein the second main electrode of the transistor is connected to a sensing line, and
wherein the comparator includes:
a second transistor having a gate and drain connected to the sensing line,
a third transistor having a gate connected to the gate of the second transistor and configured to form a current mirror together with the second transistor,
a current source connected to a drain of the third transistor and configured to determine the threshold, and
an output circuit configured to output a signal corresponding to a voltage of a node between the drain of the third transistor and the current source.

22. The device according to claim 21, wherein the comparator further includes a bypass path configured to bypass a path between a source and drain of the third transistor.

23. The device according to claim 22, wherein the output circuit includes an inverting amplifier having an input connected to the node, and
wherein the bypass path is formed from an NMOS transistor having a gate to which a predetermined voltage is applied, and a difference between the predetermined voltage and a threshold voltage of the NMOS transistor has a positive value smaller than an inverting threshold of the inverting amplifier.

24. The device according to claim 4, wherein the second main electrode of the transistor is connected to a sensing line,
wherein the comparator includes:
a second transistor having a gate and drain connected to the sensing line,
a third transistor configured to form a current mirror together with the second transistor having a gate connected to the gate of the second transistor,
a current source configured to determine the threshold,
an amplitude limiter arranged between the current source and a drain of the third transistor, and
an output circuit configured to output a signal corresponding to a node voltage between the amplitude limiter and the current source, and
wherein the amplitude limiter limits an amplitude of the node voltage.

25. The device according to claim 24, wherein the output circuit includes an inverting amplifier having an input connected to the node, and
wherein the amplitude limiter is formed from an NMOS transistor, and a difference between a voltage of a gate of the NMOS transistor and a threshold voltage of the NMOS transistor is larger than an inverting threshold of the inverting amplifier.

26. The device according to claim 21, wherein the comparator includes an idle current source connected to the sensing line.

27. The device according to claim 26, wherein with M being a size ratio of the third transistor to the second transistor and Iref being a current value of a current source configured to determine the threshold, a current value of the idle current source is smaller than Iref/M.

28. The device according to claim 25, wherein an enable signal for controlling the comparator in one of an operating and non-operating state is supplied to a gate of the NMOS transistor.

29. An image sensing system comprising:
the photoelectric conversion device according to claim 1; and
a processor configured to process a signal from the photoelectric conversion device.

30. The device according to claim 1, further comprising a sensing line which connects the second main electrode of the transistor and the readout unit,
wherein the current flowing through the second main electrode of the transistor flows through the sensing line, and the readout unit generates the digital signal, based on the current flowing through the sensing line.

31. The device according to claim 1, wherein the voltage controller is configured to continuously change the voltage of the control line, and
wherein the readout unit generates the digital signal corresponding to the voltage of the gate, based on a current flowing through the second main electrode of the transistor in a state that the voltage controller continuously changes the voltage of the control line.

32. The device according to claim 1, wherein the voltage controller is configured to linearly change the voltage of the control line.

33. A photoelectric conversion device comprising:
a photoelectric converter;
a transistor having a gate, a first main electrode and a second main electrode, a voltage corresponding to charges generated by the photoelectric converter being supplied to the gate;
a control line connected to the first main electrode of the transistor;
a voltage controller configured to change a voltage of the control line; and
a readout unit configured to generate a digital signal corresponding to a voltage of the gate, based on a current flowing through the second main electrode of the transistor during a period in which the voltage controller changes the voltage of the control line,
wherein during the period, the voltage controller changes the voltage of the control line so that a voltage between the gate and the first main electrode increases, and
wherein the readout unit generates the digital signal in response to a timing at which a value of a current flowing through the second main electrode exceeds a threshold.

34. The device according to claim 33, wherein the readout unit includes:
a comparator configured to detect that the value of the current flowing through the second main electrode of the transistor exceeds the threshold, and
a counter, and
wherein a value of the digital signal is determined in accordance with a count value of the counter in response to detection by the comparator.

35. The device according to claim 33, wherein the voltage controller includes:
a switch arranged in a path between the control line and a first voltage line, and
a current source arranged in a path between the control line and a second voltage line.

36. The device according to claim 35, wherein the voltage controller further includes a capacitor connected to the control line.

37. The device according to claim 33, wherein the voltage controller includes:
a capacitor having a first node connected to the control line, a switch arranged in a path between a first voltage line and the first node of the capacitor, and a current source arranged in a path between a second voltage line and the first node of the capacitor, and wherein after the capacitor is charged in accordance with a voltage supplied from the first voltage line by turning on the switch, the readout unit generates the digital signal in accordance with a time from a timing at which the switch is turned off to the timing at which the value of the current flowing through the second main electrode of the transistor exceeds the threshold.

38. The device according to claim 37, wherein the gate of the transistor is connected to a charge-voltage converter, wherein the device further comprises:
a transfer transistor configured to transfer charges generated by the photoelectric converter to the charge-voltage converter, and a reset transistor configured to reset a voltage of the charge-voltage converter, and wherein after resetting of the voltage of the charge-voltage converter by the reset transistor is complete and setting of the voltage of the control line by the switch is complete, the readout unit generates, as a signal indicating a noise level, a digital signal corresponding to the voltage of the gate in response to a timing at which a value of a current flowing through the second main electrode of the transistor exceeds the threshold, and then after the transfer transistor transfers the charges from the photoelectric converter to the charge-voltage converter and setting of the voltage of the control line by the switch is complete, the readout unit generates, as a signal indicating an optical signal level, a digital signal corresponding to the voltage of the gate in response to a timing at which the value of the current flowing through the second main electrode of the transistor exceeds the threshold.

39. The device according to claim 33, further comprising a selecting transistor arranged in a path between the control line and the first main electrode of the transistor.

40. The device according to claim 33, further comprising a plurality of photoelectric converters including the photoelectric converter and a plurality of transistors including the transistor, wherein the control line is connected to first main electrodes of the plurality of transistors, and wherein the readout unit is connected to second main electrodes of the plurality of transistors.

41. The device according to claim 33, wherein the voltage controller has a function of switching a readout gain of the readout unit by switching a rate of a voltage change of the control line during the period.

42. The device according to claim 33, wherein the voltage controller includes:

a switch arranged in a path between a first voltage line and the control line, and a variable current source arranged in a path between a second voltage line and the control line, and wherein a rate of a voltage change of the control line during the period is switched by switching a value of a current of the variable current source, thereby switching a readout gain of the readout unit.

43. The device according to claim 33, wherein the voltage controller includes:

a switch arranged in a path between the control line and a first voltage line, a current source arranged in a path between the control line and a second voltage line, and a variable capacitor connected to the control line, and wherein a rate of a voltage change of the control line during the period is switched by switching a capacitance value of the variable capacitor, thereby switching a readout gain of the readout unit.

44. The device according to claim 34, wherein the second main electrode of the transistor is connected to a sensing line, and wherein the comparator includes:
a second transistor having a gate and drain connected to the sensing line, a third transistor having a gate connected to the gate of the second transistor and configured to form a current mirror together with the second transistor, a current source connected to a drain of the third transistor and configured to determine the threshold, and an output circuit configured to output a signal corresponding to a voltage of a node between the drain of the third transistor and the current source.

45. The device according to claim 44, wherein the comparator further includes a bypass path configured to bypass a path between a source and drain of the third transistor.

46. The device according to claim 45, wherein the output circuit includes an inverting amplifier having an input connected to the node, and wherein the bypass path is formed from an NMOS transistor having a gate to which a predetermined voltage is applied, and a difference between the predetermined voltage and a threshold voltage of the NMOS transistor has a positive value smaller than an inverting threshold of the inverting amplifier.

47. The device according to claim 34, wherein the second main electrode of the transistor is connected to a sensing line, wherein the comparator includes:
a second transistor having a gate and drain connected to the sensing line, a third transistor configured to form a current mirror together with the second transistor having a gate connected to the gate of the second transistor, a current source configured to determine the threshold, an amplitude limiter arranged between the current source and a drain of the third transistor, and an output circuit configured to output a signal corresponding to a node voltage between the amplitude limiter and the current source, and wherein the amplitude limiter limits an amplitude of the node voltage.

48. The device according to claim 47, wherein the output circuit includes an inverting amplifier having an input connected to the node, and wherein the amplitude limiter is formed from an NMOS transistor, and a difference between a voltage of a gate of the NMOS transistor and a threshold voltage of the NMOS transistor is larger than an inverting threshold of the inverting amplifier.

49. The device according to claim 44, wherein the comparator includes an idle current source connected to the sensing line.

50. A photoelectric conversion device comprising:
a photoelectric converter;
a transistor having a gate, a first main electrode and a second main electrode, a voltage corresponding to charges generated by the photoelectric converter being supplied to the gate;

a control line connected to the first main electrode of the transistor;

a voltage controller configured to change a voltage of the control line; and a readout unit configured to generate a digital signal corresponding to a voltage of the gate, based on a current flowing through the second main electrode of the transistor during a period in which the voltage controller changes the voltage of the control line, wherein the voltage controller includes:
a switch arranged in a path between the control line and a first voltage line,
a current source arranged in a path between the control line and a second voltage line, and
a capacitor connected to the control line.

51. The device according to claim 50, wherein during the period, the voltage controller changes the voltage of the control line so that a voltage between the gate and the first main electrode increases, wherein the readout unit generates the digital signal in response to a timing at which a value of a current flowing through the second main electrode exceeds a threshold, wherein the readout unit includes:
a comparator configured to detect that the value of the current flowing through the second main electrode of the transistor exceeds the threshold, and
a counter, and wherein a value of the digital signal is determined in accordance with a count value of the counter in response to detection by the comparator.

52. The device according to claim 50, wherein the control line has a parasitic capacitance.

53. The device according to claim 50, wherein the voltage of the first voltage line is determined so that the voltage set in the control line by turning on the switch is a voltage which does not turn on the transistor.

54. The device according to claim 50, further comprising a selecting transistor arranged in a path between the control line and the first main electrode of the transistor.

55. The device according to claim 50, further comprising a plurality of photoelectric converters including the photoelectric converter and a plurality of transistors including the transistor, wherein the control line is connected to first main electrodes of the plurality of transistors, and
wherein the readout unit is connected to second main electrodes of the plurality of transistors.

56. The device according to claim 50, wherein the voltage controller has a function of switching a readout gain of the readout unit by switching a rate of a voltage change of the control line during the period.

57. The device according to claim 50, wherein the voltage controller includes:
a switch arranged in a path between a first voltage line and the control line, and
a variable current source arranged in a path between a second voltage line and the control line, and
wherein a rate of a voltage change of the control line during the period is switched by switching a value of a current of the variable current source, thereby switching a readout gain of the readout unit.

58. The device according to claim 50, wherein the voltage controller includes:

a switch arranged in a path between the control line and a first voltage line,
a current source arranged in a path between the control line and a second voltage line, and
a variable capacitor connected to the control line, and
wherein a rate of a voltage change of the control line during the period is switched by switching a capacitance value of the variable capacitor, thereby switching a readout gain of the readout unit.

59. The device according to claim 51, wherein the second main electrode of the transistor is connected to a sensing line, and wherein the comparator includes:
a second transistor having a gate and drain connected to the sensing line,
a third transistor having a gate connected to the gate of the second transistor and configured to form a current mirror together with the second transistor,
a current source connected to a drain of the third transistor and configured to determine the threshold, and
an output circuit configured to output a signal corresponding to a voltage of a node between the drain of the third transistor and the current source.

60. The device according to claim 59, wherein the comparator further includes a bypass path configured to bypass a path between a source and drain of the third transistor.

61. The device according to claim 60, wherein the output circuit includes an inverting amplifier having an input connected to the node, and wherein the bypass path is formed from an NMOS transistor having a gate to which a predetermined voltage is applied, and a difference between the predetermined voltage and a threshold voltage of the NMOS transistor has a positive value smaller than an inverting threshold of the inverting amplifier.

62. The device according to claim 51, wherein the second main electrode of the transistor is connected to a sensing line, wherein the comparator includes:
a second transistor having a gate and drain connected to the sensing line,
a third transistor configured to form a current mirror together with the second transistor having a gate connected to the gate of the second transistor,
a current source configured to determine the threshold,
an amplitude limiter arranged between the current source and a drain of the third transistor, and
an output circuit configured to output a signal corresponding to a node voltage between the amplitude limiter and the current source, and
wherein the amplitude limiter limits an amplitude of the node voltage.

63. The device according to claim 62, wherein the output circuit includes an inverting amplifier having an input connected to the node, and wherein the amplitude limiter is formed from an NMOS transistor, and a difference between a voltage of a gate of the NMOS transistor and a threshold voltage of the NMOS transistor is larger than an inverting threshold of the inverting amplifier.

64. The device according to claim 59, wherein the comparator includes an idle current source connected to the sensing line.

* * * * *